United States Patent
Inadome

(10) Patent No.: US 8,472,088 B2
(45) Date of Patent: Jun. 25, 2013

(54) IMAGE READING APPARATUS, IMAGE READING METHOD AND COMPUTER-READABLE INFORMATION RECORDING MEDIUM

(75) Inventor: Takanori Inadome, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 872 days.

(21) Appl. No.: 12/615,379

(22) Filed: Nov. 10, 2009

(65) Prior Publication Data

US 2010/0118353 A1    May 13, 2010

(30) Foreign Application Priority Data

Nov. 12, 2008 (JP) ................... 2008-289683
Oct. 26, 2009 (JP) ................... 2009-245874

(51) Int. Cl.
*H04N 1/04* (2006.01)
*H04N 1/00* (2006.01)
*H04N 1/36* (2006.01)
*H02P 8/00* (2006.01)

(52) U.S. Cl.
USPC ........... 358/474; 358/409; 358/412; 358/496; 358/498; 358/486; 358/448; 358/453; 358/404; 358/444; 318/696

(58) Field of Classification Search
USPC ................ 358/409, 412, 496, 497, 498, 468, 358/448, 474, 486, 404, 444; 318/696, 685, 318/683

See application file for complete search history.

(56) References Cited

U.S. PATENT DOCUMENTS

| | | | | |
|---|---|---|---|---|
| 6,144,184 A * | 11/2000 | Yamaguchi | ................... | 318/696 |
| 6,160,636 A * | 12/2000 | Nagano et al. | ................. | 358/412 |
| 6,335,807 B1 * | 1/2002 | Neale et al. | ................... | 358/486 |
| 6,388,777 B1 * | 5/2002 | Miyajima | ..................... | 358/486 |
| 6,615,115 B1 * | 9/2003 | Huang | ........................... | 700/302 |
| 6,972,876 B2 * | 12/2005 | Yokochi | ........................ | 358/471 |
| 6,984,956 B2 * | 1/2006 | Kang et al. | ................... | 318/685 |
| 7,136,200 B2 * | 11/2006 | Chen et al. | ................... | 358/474 |
| 7,202,981 B2 * | 4/2007 | Wang | ........................... | 358/486 |
| 7,301,680 B1 * | 11/2007 | Jones | ........................... | 358/496 |
| 7,427,847 B2 * | 9/2008 | Yoshihisa | .................... | 318/685 |
| 8,218,183 B2 * | 7/2012 | Wang | ......................... | 358/1.15 |
| 8,253,988 B2 * | 8/2012 | Inukai | ........................ | 358/474 |
| 2004/0125416 A1 * | 7/2004 | Gawlik et al. | ................. | 358/474 |
| 2008/0231916 A1 | 9/2008 | Inadome et al. | | |

FOREIGN PATENT DOCUMENTS

JP     09-083751    3/1997
JP     10-145551    5/1998

* cited by examiner

*Primary Examiner* — Cheukfan Lee
(74) *Attorney, Agent, or Firm* — IPUSA, LLC

(57) ABSTRACT

An original is read by an original reading unit configured to read image data, at least one of the original reading unit and the original is driven by a driving motor in a sub-scan direction, and, when an amount of the image data stored by the image data storing unit becomes equal to or more than a predetermined amount, the rotational speed of the driving motor is reduced according to driving control data provided for each of current rotation angles of the driving motor for finally stopping the driving motor at a predetermined rotation angle, and a speed in a sub-scan direction at which the original reading unit reads the original is reduced. Then, main scan line data are thinned out from the image data according to thin-out data provided for each driving control data, and image data of the original are restored.

6 Claims, 18 Drawing Sheets

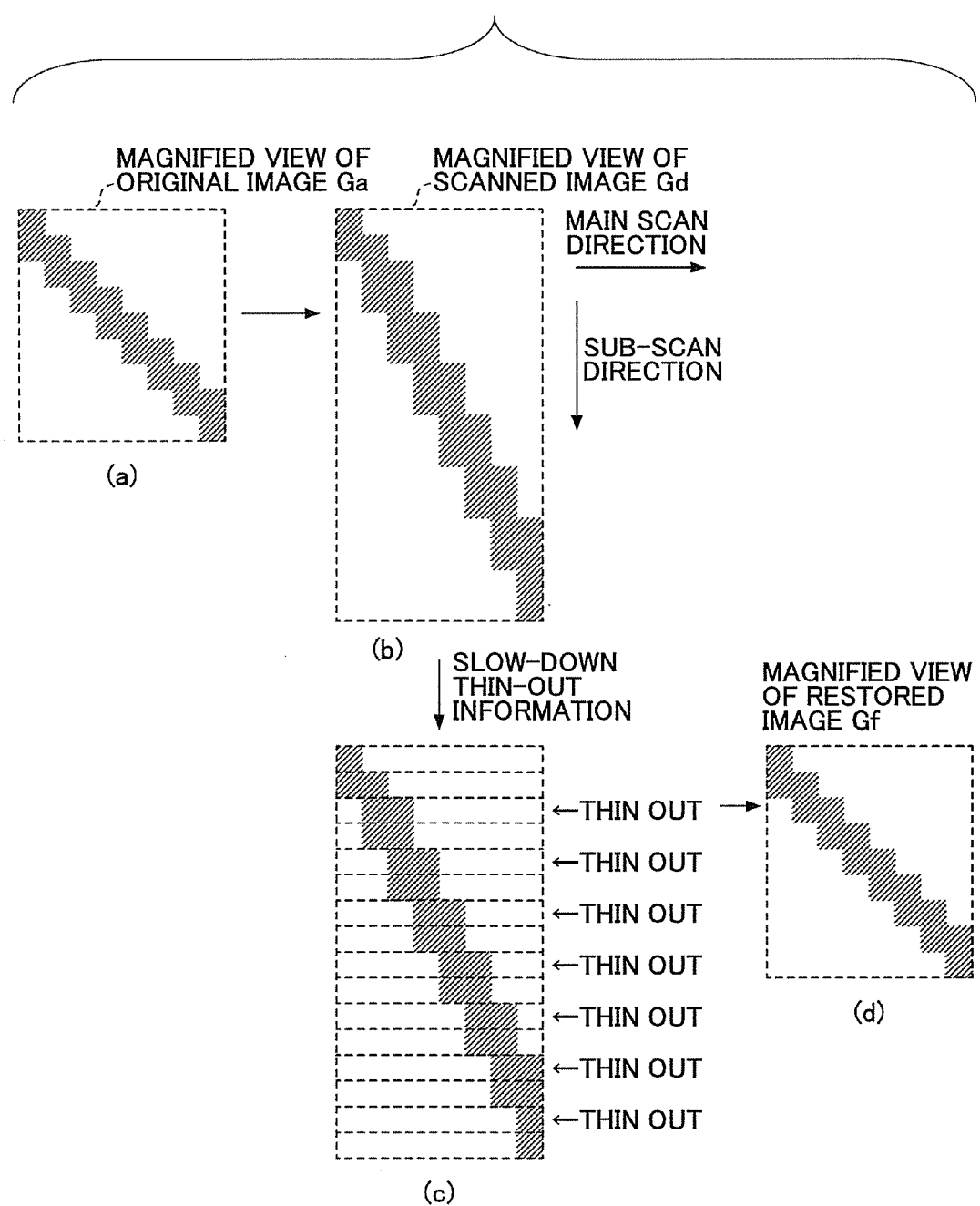

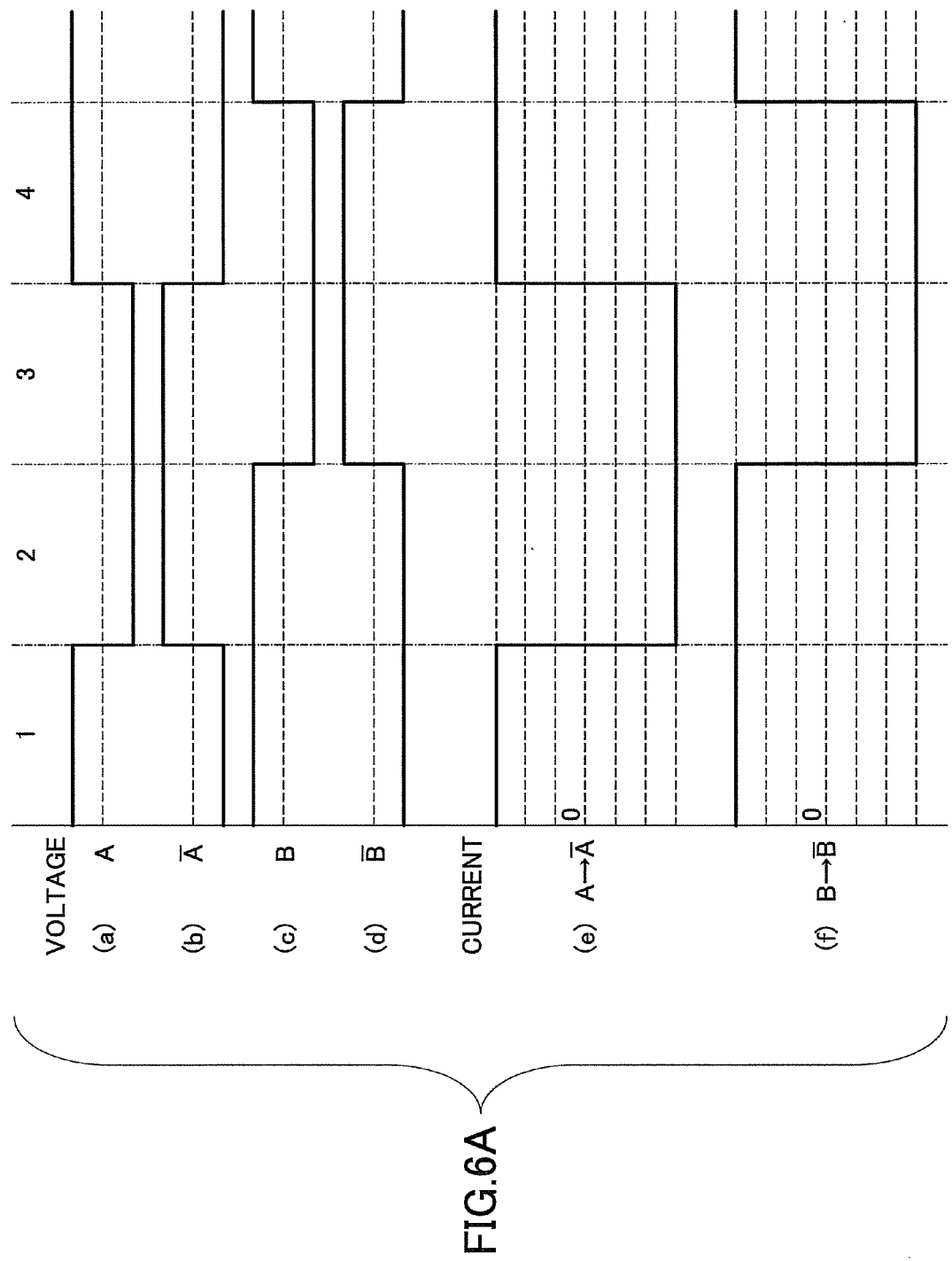

IMAGE READING APPARATUS, IMAGE READING METHOD AND COMPUTER-READABLE INFORMATION RECORDING MEDIUM

BACKGROUND OF THE INVENTION

1. Field of the Invention

The present invention relates to an image reading apparatus, an image reading method and a computer-readable information recording medium, and, in detail, to an image reading apparatus, an image reading method and a computer-readable information recording medium, for reading an image of an original with appropriately adjusting an image reading speed at low cost.

2. Description of the Related Art

In an image reading apparatus of a scanner apparatus, a copying apparatus, a facsimile apparatus, a multifunction peripheral apparatus or such, in a case where an original reading unit that does not move reads an image of an original while the original is conveyed by an automatic document feeding unit, a photoelectric conversion device such as a CCD (charge coupled device) or such of the original reading unit converts reflected light from the original to read the image data of the original, main scan line by main scan line. The image data of the original are then temporarily stored in a memory having a predetermined capacity, and then, the image data of the original are transferred from the memory to an image processing unit that carries out various sorts of image processing on the image data and produces an output image.

The image reading apparatus continuously carries out in sequence a series of operations of once storing the image data read by the original reading unit, and then transferring the stored image data to the image processing unit that then carries out image processing on the image data. Ordinarily, an image data reading speed of the original reading unit (i.e., an image data storing speed for transferring the image data to the memory and storing the image data in the memory) is set higher than an image processing speed of the image processing unit (i.e., an image data transferring speed for transferring the image data from the memory to the image processing unit). Therefore, along with a progress of the image reading operation, an image data stored amount in the memory increases accordingly. Since the memory has a limited capacity, the image data transferred to the memory from the original reading unit may not be stored in the memory and may be lost when the data amount stored in the memory exceeds the storage capacity of the memory.

Then, in the image reading apparatus, scanning and reading of image data by the original reading unit is interrupted when the data amount of image data stored in the memory becomes close to the storage capacity of the memory, and transferring the image data to the memory is interrupted, while transferring the image data to the image processing unit from the memory is continued. Thereby, the data amount of the image data stored in the memory is reduced accordingly. Then, the image reading apparatus re-starts scanning and reading of image data by the original reading unit when the data stored amount in the memory has been reduced to a predetermined data amount, and transferring of the image data to the memory from the original reading unit is also re-started. Thus, so-called intermittent reading operation is carried out in which operation of the original reading unit is interrupted and re-started appropriately as mentioned above.

In the image reading apparatus, in a case where the original conveyance is carried out by an ADF (Auto Document Feeder), the intermittent reading operation is carried out in such a manner described below. That is, the image reading apparatus provided with the ADF drives a feeding roller or such by means of a driving motor (for example, a stepping motor), plural sheets of an original set on a original table are conveyed to the original reading unit sheet by sheet, the original reading unit reads image data of the original, and image data of the original thus read are transferred to the memory. Then, when the data amount of the image data thus stored in the memory becomes close to the storage capacity of the memory, a rotational speed of the driving motor that drives the ADF is reduced, and finally, the driving motor is stopped. Thus, a speed of feeding the original is reduced to a speed lower than that of an ordinary reading operation, and finally, the ADF is stopped. Such an operation is referred to as "slow-down reading operation", hereinafter. After that, in the image reading apparatus, the image data stored in the memory are transferred to the image processing unit in sequence. Then, when the data amount of the image data stored in the memory has been reduced to the predetermined data amount, the once stopped driving motor is again driven, first at a speed lower than that of the ordinary reading operation, the rotational speed of the driving motor is increased to the rotational speed of the ordinary reading operation. The original is thus conveyed at an original conveyance speed in the ordinary reading operation. Such an operation is referred to as "slow-up reading operation", hereinafter. That is, in the image reading apparatus in the related art, the slow-up reading operation and the slow-down reading operation are simply repeated, scanning and reading is thus stopped and re-started, and thus, intermittent reading operation in a simple stop/start way is carried out.

Further, in the image reading apparatus in the related art, generally speaking, an inexpensive stepping motor that merely requires a simple control mechanism is used as the driving motor.

Further, in the related art, driving control clock pulses used for driving the stepping motor that conveys a sheet of an original are counted, plural driving patterns are prepared for controlling driving states of the stepping motor in response to load states of the stepping motor according to a position at which the sheet of the original is conveyed. Then, when conveyance of the original is stopped and re-started in reading image data of the original, a driving pattern is selected corresponding to a load state of the stepping motor concerning a position at which the original is stopped according to the counted number of the pulses, and a driving state of the driving motor is controlled according to the selected driving pattern (see Japanese Laid-Open Patent Application NO. 10-145551).

That is, in the related art, upon the intermittent reading operation in which an image data reading operation is stopped and re-started, a load fluctuation of the stepping motor is obtained, a driving pattern according to a load state is selected, and driving of the stepping motor is controlled according to the selected driving pattern. Thus, even when an original conveyance path has a large load fluctuation or even in the intermittent reading operation during an image data high-speed reading operation, an occurrence of a distortion in read image data or a synchronization loss is avoided.

In the above-mentioned intermittent reading operation, image data read by the original reading unit during the slow-up/slow-down reading operation have an increased resolution as a reading speed is decreased. Therefore, when image data of the entirety of the original are restored from the read image data by the image processing unit, image processing may be carried out in such a manner that an operation of thinning out image data in units of main scan lines on the image data read by the original reading unit may be carried out, depending on whether the image data were read in the slow-up/slow-down reading operation or the ordinary reading operation. Thus, finally, image data of the original may be appropriately restored.

SUMMARY OF THE INVENTION

The present invention has been devised in consideration of the above-mentioned situation, and an object of the present invention is to provide an image reading apparatus, an image reading method and a computer-readable information recording medium, by which, main scan line data to be thus thinned out from image data read in an intermittent reading operation are determined according to a speed variation of a driving motor, and thus, it is possible to improve image quality of thus-restored image data of an original.

According to the present invention, an image reading apparatus, includes an original reading unit configured to read image data from the original; a driving motor configured to drive at least one of the original reading unit and the original in a sub-scan direction so that the original reading unit scans the original to read it; an image data storing unit configured to store the image data read by the original reading unit; an image processing unit configured to restore image data of the original from the image data stored by the image data storing unit; and a reading operation control unit configured to control a rotational speed of the driving motor. When an amount of the image data stored by the image data storing unit becomes equal to or more than a predetermined amount, the reading operation control unit reduces the rotational speed of the driving motor according to driving control data provided for each of current rotation angles of the driving motor, for finally stopping the driving motor at a predetermined rotation angle, and to reduce a speed in the sub-scan direction at which the original reading unit reads the original, and the image processing unit thins out main scan line data from the read image data, according to thin-out data provided for each driving control data, to restore image data of the original.

Other objects, features and advantages of the present invention will become more apparent from the following detailed description when read in conjunction with the accompanying drawings.

BRIEF DESCRIPTION OF THE DRAWINGS

FIG. 5 illustrates a thinning-out operation in a case of slow-down reading operation;

FIGS. 6A and 6B illustrate a two-phase excitation way of a two-phase bipolar stepping motor;

DETAILED DESCRIPTION OF THE PREFERRED EMBODIMENTS

Below, preferred embodiments of the present invention will be described with reference to the figures. It is noted that, although the embodiments described below have various technically preferable limitations added thereto because of the preferred embodiments of the present invention, the scope of the present invention is not unduly limited by the following descriptions, and all of the features described for the embodiments are not necessarily the essential features of the present invention.

Figure 1:
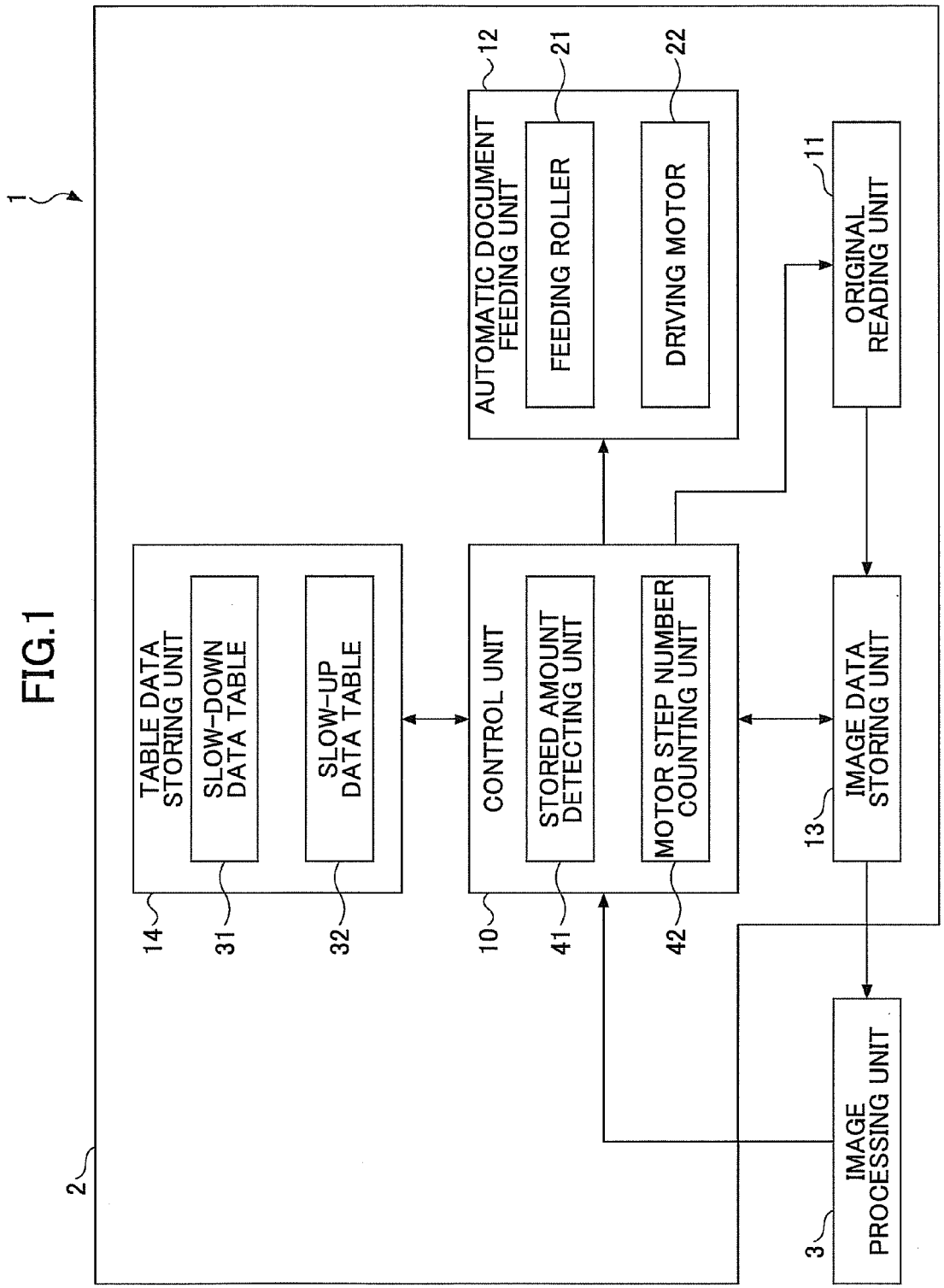
FIG. 1 depicts a block diagram of part of an image reading apparatus according to one embodiment of the present invention.

FIGS. 1-5 depict one embodiment of an image reading apparatus, an image reading method and a computer-readable information recording medium according to the present invention. FIG. 1 depicts a partial block diagram of an image reading apparatus 1 according to the embodiment of an image reading apparatus, an image reading method and a computer-information recording medium according to the present invention.

In FIG. 1, the image reading apparatus 1 is a scanner apparatus, a copying apparatus, a facsimile apparatus, a multi-function peripheral apparatus or such, and includes an image reading unit 2 and an image processing unit 3. The image reading unit 2 includes a control unit 10, an original reading unit 11, an automatic document feeding unit 12, an image data storing unit 13 and a table data storing unit 14. The control unit 10 controls the respective units of the image reading unit 2, reads an image and notifies the image processing unit 3 of reading timing.

The automatic document feeding unit (sub-scan moving unit) 12 includes an original table on which plural sheets of an original are set, and a feeding mechanism that conveys the original from the original table through the original reading unit 11, sheet by sheet, and ejects the original from which the image has been read, to a paper ejecting tray (not depicted). The feeding mechanism includes a feeding roller 21 that conveys the original, sheet by sheet, and a driving motor 22 that drives and rotates the feeding roller 21. As the driving motor 22, a two-phase bipolar stepping motor is used. In a case where the two-phase bipolar stepping motor is driven according to a 4W1-2 phase excitation way, the stepping motor is excited in a two-phase excitation state every 16 steps, as known. The stepping motor is driven and rotated in synchronization with driving control clock pulses. In the case where the stepping motor is driven according to the 4W1-2 phase excitation way, the stepping motor is driven in the two-phase excitation state every 16 driving control clock pulses. When the stepping motor is stopped at a rotation angle of the two-phase excitation state, the stepping motor can be re-started without occurrence of a synchronization loss. However, when the stepping motor is stopped at a rotation angle other than that of the two-phase excitation state, a synchronization loss may occur when the stepping motor is re-started. It is noted that, although a two-phase bipolar stepping motor is used as the driving motor 22 in the embodiment, the driving motor 22 is not limited to a two-phase bipolar stepping motor. In the automatic document feeding unit 12, the driving motor 22 drives the feeding roller 21 and other conveyance mechanisms, and thus, the plural sheets of the original, set on the original table, are conveyed through an original reading position of the original reading unit 11, sheet by sheet, at a speed according to a rotational speed of the driving motor 22. The original reading unit 11 includes a CCD (Charge Coupled Device), a light source that illuminates the original at the original reading position with a reading light, and a lens that condenses light reflected by the original to the CCD. The original reading unit 11 reads image data of the original conveyed through the original reading position, in units of main scan lines, under the control of the control unit 10, and outputs read image data to the image data storing part 13.

As the image data storing unit 13, a RAM (Random Access Memory) or such having a predetermined capacity is used. The image data storing unit 13 stores the image data of the original, read by the original reading unit 11, in units of main scan lines, in sequence. Further, the image data storing unit 13 outputs the thus-stored image data to the image processing unit 3 in sequence under the control of the control unit 10.

The image reading apparatus 1 further includes a table data storing unit (slow-down information storing unit, slow-up information storing unit) 14. As the table data storing unit 14, a NVRAM (Nonvolatile Random Access Memory) or such is used for example. The table data storing unit 14 stores a slow-down data table 31 and a slow-up data table 32. The slow-down data table 31 has table data such that, rotation speed data (slow-down driving control data) used for driving the driving motor 22 for a slow-down reading operation in which the driving motor 22 is driven at a rotational speed lower than a rotation speed of an ordinary reading operation (referred to as an ordinary reading rotational speed, hereinafter), and finally, is stopped; and slow-down thin-out data (indicative of main scan lines to be thin out) for the image processing unit 3, are associated with one another in a form of tables. The slow-down data table 31 includes plural slow-down data tables Ta through Tp (as described below) corresponding to the numbers of steps of the driving motor 22 detected at a time when a main scan period line pulse is asserted. The "number of steps" means the number of steps counted from a time when the driving motor 22 (stepping motor) is at a rotation angle of the immediately antecedent two-phase excitation state. Further, each of the slow-down data tables Ta through Tp are previously created to correspond to the numbers of steps of the deriving motor 22 such that the driving motor 22 will finally be stopped at a rotation angle of any two-phase excitation state. The slow-up data table 32 has table data such that, rotation speed data (slow-up driving control data) used for driving the driving motor 22 for a slow-up reading operation in which driving of the driving motor 22 is started at a rotational speed lower than the ordinary reading rotational speed, and finally, is driven at the ordinary reading rotational speed; and data thin-out main scan line data (slow-up thin-out data) for the image processing unit 3, are associated with one another in a form of a table.

The control unit (reading operation control unit) 10 includes a CPU (Central Processing Unit), a ROM (Read Only Memory) and a RAM, each being not depicted, and further, includes a stored amount detecting unit 41 and a motor step number counting unit 42. The CPU controls the respective units of the image reading unit 2 and the respective units of the image reading apparatus 1, by using the RAM as a work memory, based on a computer program stored in the ROM, and thus, carries out functions of the image reading apparatus 1 and also, carries out an image reading method. That is, the image reading apparatus 1 reads the computer program (image reading program) for carrying out the image reading method, stored in a computer-readable information recording medium such as a ROM, an EEPROM (Electrically Erasable and Programmable Read Only Memory), an EPROM, a flash memory, a flexible disk, a CD-ROM (Compact Disc Read Only Memory), a CD-RW (Compact Disc Rewritable), a DVD (Digital Versatile Disk), a SD (Secure Digital) card, a MO (Magneto-Optical Disc) or such, and introduces the computer program therefrom to the ROM or such, and thus, is configured to perform the image reading method in which the slow-down reading operation and the slow-up reading operation is carried out. The image reading program is a computer-executable program described in a legacy programming language such as assembler, C, C++, C#, Java (registered trademark) or such, or an object-oriented programming language or such, and may be stored in the above-mentioned recording medium and then, may be distributed therewith.

The stored amount detecting unit 41 measures an amount of image data stored in the image data storing unit 13. The stored amount detecting unit 41 detects an amount of image data stored in the image data storing unit 13, for example, as a ratio of the stored data amount with respect to the storage capacity of the image data storing unit 13, or, concretely, as an absolute value of the stored image data amount.

The motor step number counting unit 42 counts the number of steps of the driving motor 22 of the automatic document feeding unit 12.

The control unit 10 starts an intermittent operation from an ordinary reading operation when a data amount of image data stored in the image data storing unit 13 detected by the stored amount detecting unit 41 reaches a predetermined slow-down starting data amount that is determined with respect to the storage capacity of the image data storing unit 13. When starting the intermittent operation, the control unit 10 selects a slow-down data table from among the slow-down data tables Ta through Tp of the slow-down data table 31, based on the number of steps of the driving motor 22 detected at a time when the next main scan line period pulse is asserted. Then, the control unit 10 obtains, from the selected slow-down data table, slow-down driving control data for the driving motor 22, drives the driving motor 22 according to the obtained slow-down driving control data, to gradually slow down the driving motor 22, and finally stops the driving motor 22. Such an operation is referred to as "slow-down reading operation". Further, the control unit 10 stores image data, thus read by the original reading unit 11 in the slow-down reading operation, in the image data storing unit 13, and also, obtains thin-out main scan line information from the slow-down data table selected from among the slow-down data table Ta through Tp based on the number of steps as mentioned above to be used for restoring image data from the image data stored in the image data storing unit 13, and transfers the obtained thin-out main scan line information to the image processing unit 3. During the slow-down reading operation, the data amount stored in the image data storing unit 13 is reduced, and finally storing is stopped, while, transferring of image data from the image data storing unit 13 to the image processing unit 3 is continued. Therefore, the data amount stored in the image data storing unit 13 is reduced accordingly.

Then, when the data amount stored in the image data storing unit 13 has thus been reduced to a predetermined slow-up starting data amount, the control unit 10 obtains the slow-up driving control data from the slow-up data table 32, drives the driving motor 22 according to the obtained slow-up driving control data, to gradually increase a rotational speed of the driving motor 22, finally to the ordinary reading rotational speed. Thus, the control unit 10 returns to carry out an ordinary reading operation. Such an operation is referred to as a slow-up reading operation.

The image processing unit 3 carries out a thinning-out operation on slow-down image data that have been read in the slow-down reading operation and slow-up image data that have been read in the slow-up reading operation of image data input from the image storing unit 13, based on the slow-down thin-out data and the slow-up thin-out data, respectively, notified by the control unit 10, to restore image data of the original. Also, the image processing unit 3 carries out, on the read image data, various sorts of image processing, for example, background removal processing, filtering processing, masking processing and error diffusion processing.

Further, in the image reading apparatus 1, for the purpose of improving an original reading speed, a main-scan-direction driving period that is an original reading period of the original reading unit 11 and a sub-scan-direction driving period of the driving motor 22 may be asynchronous with one another.

Next, an operation of the image reading apparatus 1 according to the embodiment will be described. The image reading apparatus 1 according to the embodiment appropriately carries out an intermittent reading operation including a slow-down reading operation and a slow-up reading operation to make it possible to reduce a storage capacity of the image data storing unit 13, also can avoid an occurrence of a synchronization loss in the driving motor 22, and can improve image quality of read image data by appropriately carrying out thinning-out of image data read in the slow-down/slow-up reading operation.

Figure 2:
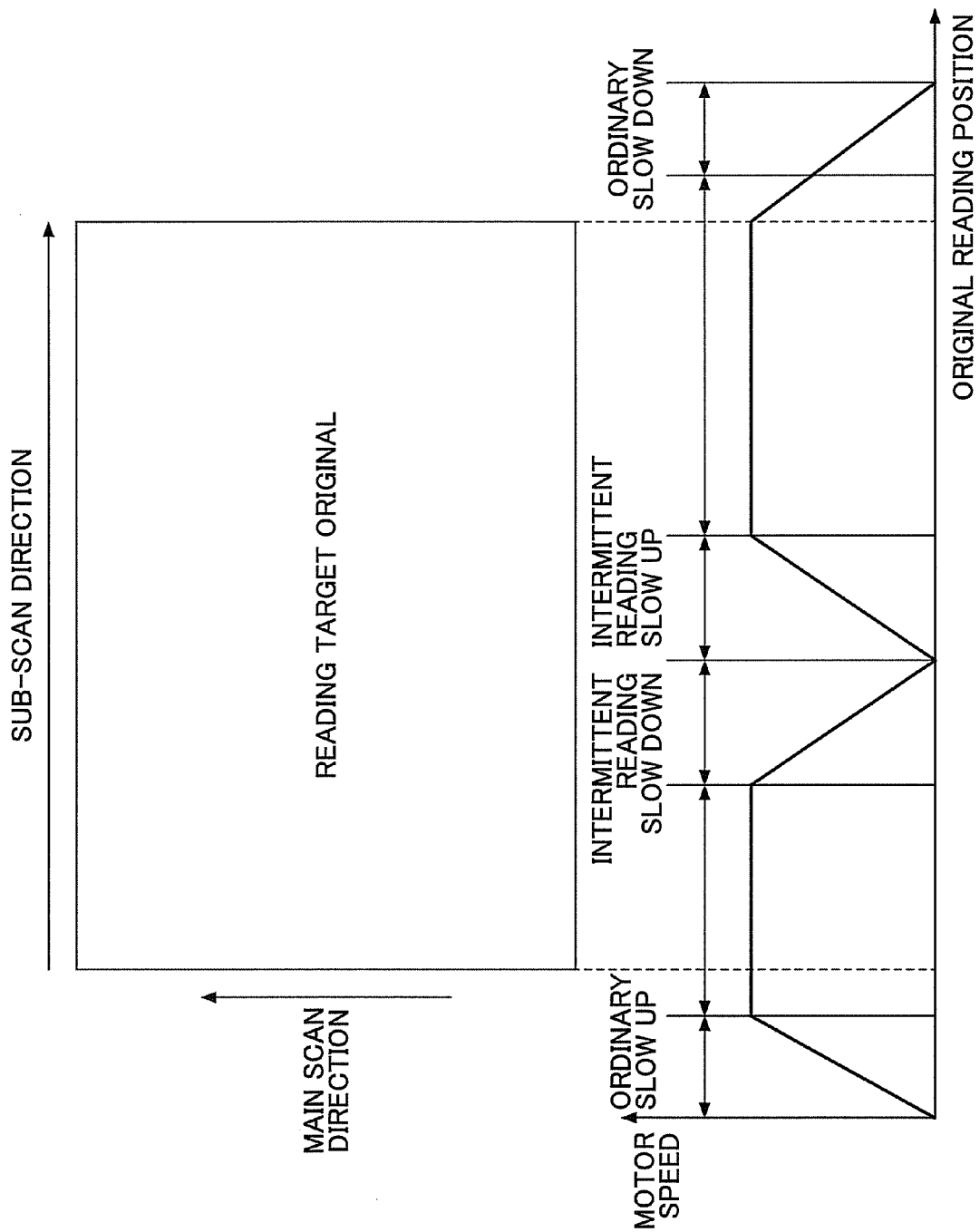
FIG. 2 illustrates an operation of the image reading apparatus.

That is, according to the image reading apparatus 1, when an original is read, as depicted in FIG. 2, first the control unit 10 outputs a control signal to the automatic document feeding unit 12, to carry out an ordinary slow-up operation of starting up the driving motor 22, and increasing a rotational speed of the driving motor 22 to the ordinary reading rotational speed. During the ordinary slow-up operation, the original reading unit 11 does not carry out reading of an original. It is noted that, in a case where a function of an ADF is used, an original is conveyed in the ordinary slow-up operation. That is, the feeding roller 21 conveys the original from an original conveyance starting position on the original table through the original reading position. In this case, at a time when the original has been conveyed to the original reading position, a rotational speed of the driving motor 22 has been increased to a constant speed (i.e., the ordinary reading rotational speed), and thus, a constant speed operation has been started. The control unit 10 causes the original reading unit 11 to start reading of the original at a time when the original has been conveyed to the original reading position, the original reading unit 11 then reads an image of the original that is conveyed at a constant original conveyance speed in units of main scan lines, and transfers read image data to the image storing unit 13 in units of main scan line in sequence, which then stores the transferred image data.

In the image reading apparatus 1, a writing speed of transferring the image data from the original reading unit 11 and writing it in the image data storing unit 13 is higher than a reading speed of reading the image data from the image data storing unit 13 and transferring it to the image processing unit 3. Therefore, the stored amount of the image data in the image data storing unit 13 gradually increases accordingly.

The control unit 10 detects the stored amount of the image data in the image data storing unit 13 by means of the stored amount detecting unit 41, and determines whether the stored amount in the image data storing unit 13 reaches a previously set slow-down starting data amount.

When reading of the original, up to the rear end thereof, has been completed before the stored amount in the image data storing unit 13 reaches the slow-down starting data amount, the control unit 10 sends a control signal to the automatic document feeding unit 12 to carry out ordinary slow-down operation of gradually reducing a rotational speed of the driving motor 22 from the ordinary reading rotational speed, and finally stopping the driving motor 22. During the ordinary slow-down operation, the original reading unit 11 does not carry out reading the original.

Figure 3:
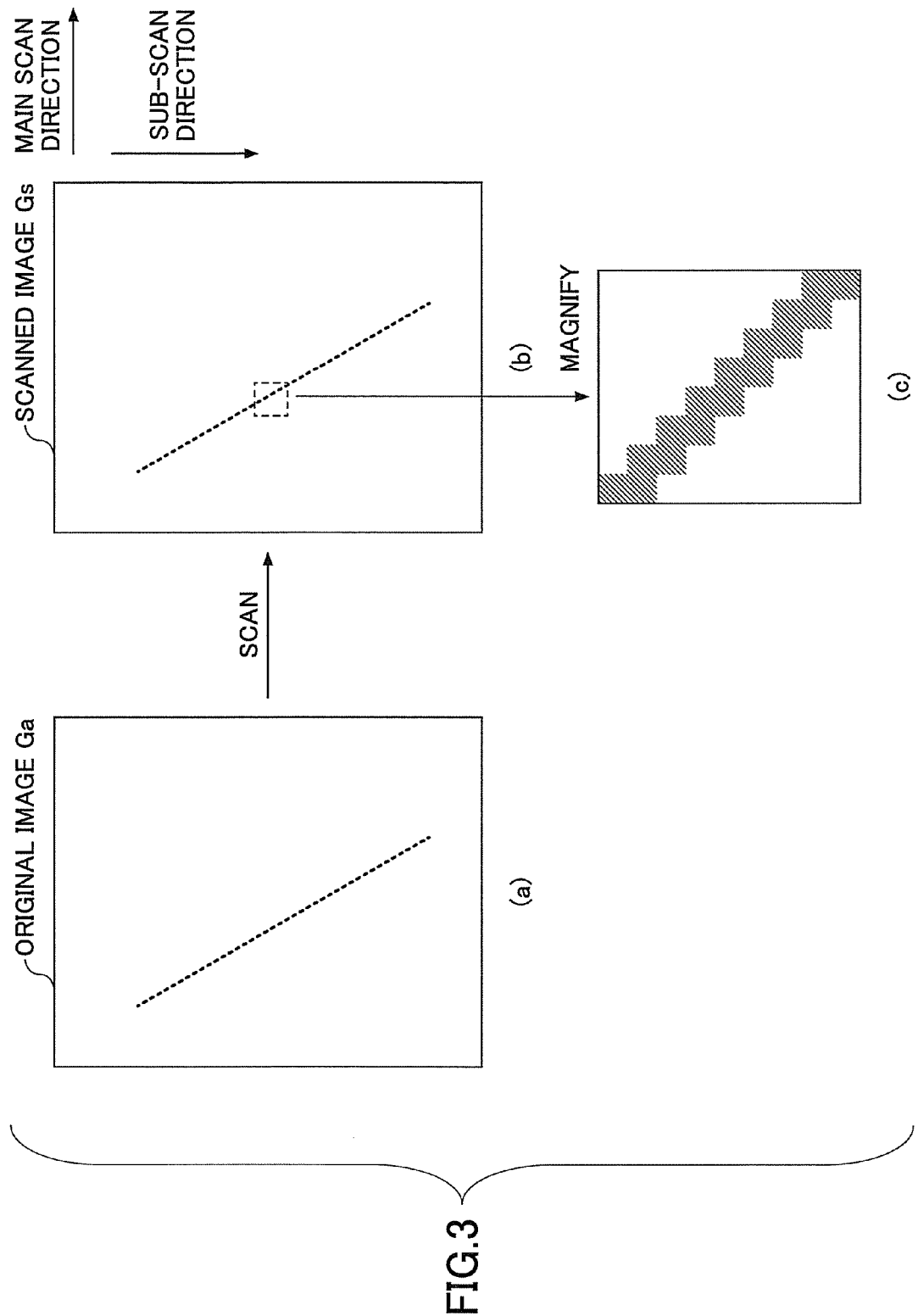
FIG. 3 depicts an original image, a scanned image and a partial magnified view of the scanned image, in a case of an ordinary reading operation.

In a case where no intermittent reading operation is carried out during reading of the original, as depicted in FIG. 3, the original image Ga (FIG. 3 (a)) and a scanned image Gs (FIG. 3 (b)) read by the original reading unit 11 has the same resolution in both of the main scan direction and the sub-scan direction. For example, in a case where a reading resolution is 600 dpi by 600 dpi, the original reading unit 11 carries out scanning and reading of image data in such a manner that one main scan line has a width of approximately 42 μm in sub-scan direction of the original image Ga. At this time, the scanned image Gs read by the original reading unit 11 includes a collection of dots each being a square of 42 μm by 42 μm, as depicted in FIG. 3 (c) that shows a magnified view a part of an oblique line depicted in FIG. 3 (b).

However, when the image data amount stored in the image data storing unit 13 reaches the slow-down stating data amount while the original reading unit 11 reads the original, the control unit 10 carries out an intermittent reading operation including a slow-down reading operation (intermittent reading slow down) and a slow-up reading operation (intermittent reading slow up), as depicted in FIG. 2.

During the slow-down reading operation and the slow-up reading operation, a rotation speed of the driving motor 22 is controlled for an original conveyance speed lower than that of the ordinary original conveyance speed, for example, half the ordinary original conveyance speed. Further, the image processing unit 3 thins out main scan lines of the read image data to restore image data, in response to an increase in a reading resolution that increases in the sub-scan direction as a result of the original conveyance speed being thus reduced.

For this purpose, according to the image reading apparatus 1 according to the embodiment, the table data storing unit 14 stores the slow-down table 31 that includes the plural slow-down data tables Ta through Tp respectively associated with the numbers of steps of the driving motor 22 detected at a time when a main scan line period pulse is asserted as mentioned above. In each of the slow-down data tables Ta through Tp, rotational speed data (slow-down driving control data) of the driving motor 22 for a slow-down reading operation of driving the driving motor 22 at a rotational speed lower than the ordinary reading rotational speed, and stopping the driving motor 22; and data thin-out main scan line data (slow-down thin-out data) for the image processing unit 3, are associated with one another. The table data storing part 14 further stores the slow-up data table 32. In the slow-up data table 32, rotational speed data (slow-up driving control data) of the driving motor 22 for a slow-up reading operation to start driving the driving motor 22 at a rotational speed lower than the ordinary reading rotational speed, and increasing the rotational speed of the driving motor 22 to the ordinary rotational speed, and data thin-out main scan line data (slow-up thin-out data) for the image processing unit 3, are associated with one another in a form of a table. The slow-down driving control data are such as to finally stop the driving motor 22 at a phase excitation state, of plural phase excitation states of the driving motor 22, from which state it is possible to start up the driving motor. Specifically, the slow-down driving control data are for finally stopping the driving motor 22 (stepping motor) at a rotation angle of a two-phase excitation state as mentioned above.

When the image data amount stored in the image data storing unit 13 reach the slow-down starting data amount, the control unit 10 determines that it is a time to start a slow-down reading operation, selects a slow-down data table corresponding to the count value of the motor step number counting unit 42, from among the slow-down data tables Ta through Tp of the slow-down data table 31, controls driving the driving motor 22 according to driving control data of the selected slow-down data table, and finally stops the driving motor 22. More specifically, when determining that it is a time to start a slow-down reading operation from an ordinary reading operation, the control unit 10 selects a slow-down data table corresponding to the number of steps counted by the motor step number counting unit 42 at a time when a next main scan line period pulse is asserted, from among the plural slow-down data tables Ta through Tp registered in the slow-down data table 31, reads slow-down driving control data from the selected slow-down data table, and controls driving the driving motor 22 according to the slow-down driving control data, to control a rotational speed of the driving motor 22. Further, the control unit 10 reads slow-down thin-out data from the slow-down data table thus selected from the slow-down data tables Ta through Tp of the slow-down data table 31, and sends the read slow-down thin-out data to the image processing unit 3. The slow-down thin-out data include data indicative of main scan lines to be thin out.

Figure 4:
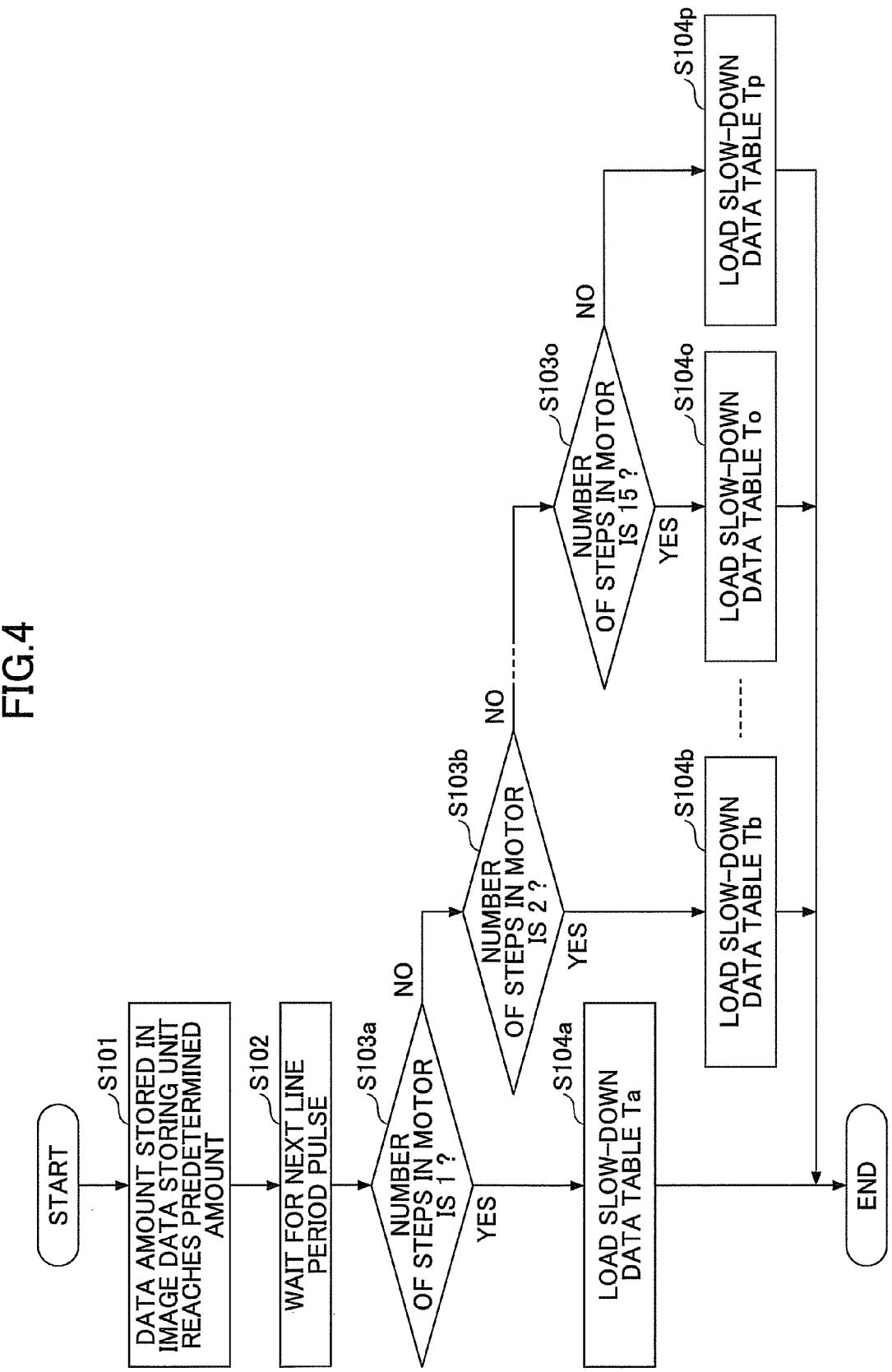
FIG. 4 depicts a flowchart of a slow-down reading operation.

That is, as depicted in FIG. 4, when a data amount of image data stored in the image data storing unit 13 reaches the slow-down starting data amount (step S101), the control unit 10 waits for a next main scan line period pulse (step S102). Then, when the next main scan line period pulse is asserted, the control unit 10 determines which of "1" through "16" corresponds to the number of steps of the driving motor 22, from a count value of the motor step number counting unit 42 (steps S103a through S103o).

The control unit 10 selects a slow-down data table corresponding to the thus-obtained number of steps of the driving motor 22 from among the slow-down data tables Ta through Tp of the slow-down data table 31 stored in the table data storing unit 14, reads slow-down driving control data from the selected slow-down data table, and controls the driving motor 22 according to the slow-down driving control data, to control a rotational speed of the driving motor 22 (steps S104a through S104p). Further, although not depicted in FIG. 4, the control unit 10 reads slow-down thin-out data from the slow-down data table thus selected from the slow-down data tables Ta through Tp of the slow-down data table 31, and sends the obtained slow-down thin-out data to the image processing unit 3.

Thus, the driving motor (stepping motor) 22 is finally stopped at a rotation angle of a two-phase excitation state in a slow-down reading operation, and therefore, when the driving motor 22 is re-started, the driving motor 22 can be started up without a synchronization loss.

The image processing unit 3 thins out main scan lines from the image data, read by the original reading unit 11 in the slow-down reading operation, and input via the image storing unit 13, and restores image data of the original, and carries out other necessary image processing.

In a case where an original image Ga of an oblique line depicted in FIG. 5 (*a*) is read in the slow-down reading operation, the read image (scanned image) Gd as depicted in FIG. 5 (*b*), that is elongated in the sub-scan direction, and thus, has an increased resolution in the sub-scan direction with respect to the original image Ga, is obtained. For example, in a case where a reading resolution of the image reading apparatus 1 is 600 dpi by 600 dpi as mentioned above, the original reading unit 11 carries out an image data reading operation in such a manner that a main scan line has a width of approximately 42 μm in the sub-scan direction of an original image Ga depicted in FIG. 3. In the slow-down reading operation, since an original conveyance speed is reduced (for example, ½ speed), an image reading resolution of the original reading unit 11 increases accordingly, and, as depicted in FIG. 5 (*b*), a read image Gd is elongated in the sub-scan direction in response to the reduction in the original conveyance speed (to ½ speed). In the above-mentioned example in which the original is read in such a manner that a main scan line has a width of approximately 42 μm in the sub-scan direction in the ordinary reading operation, when the rotational speed of the driving motor 22 thus becomes half (½) as mentioned above, an image having a width of approximately 42 μm is read on two successive main scan lines. As a result, the read image Gd becomes longer than the original image Ga in the sub-scan direction.

Therefore, according to the image reading apparatus 1 according to the embodiment 1, rotational speed data (slow-down driving control data) for the slow-down reading operation and data of main scan lines to be thinned out for the image processing unit 3 (slow-down thin-out data) are associated with one another as mentioned above. Also, the plural slow-down data tables Ta through Tp respectively corresponding to the numbers of steps of the driving motor 22 at a time when a main scan line period pulse is asserted, are stored as the slow-down data table 31 in the table data storing unit 14. Then, as mentioned above, based on the number of steps at a time when a main scan line period pulse is asserted after the time for starting the slow-down operation, the corresponding slow-down data table is selected from the slow-down data tables Ta through Tp. Thus, the slow-down driving control data are determined, and driving of the driving motor 22 is controlled according to the determined slow-down driving control data. Also, from the selected slow-down data table, the slow-down thin-out data for determining, as depicted in FIGS. 5 (*b*) and (*c*), main scan lines to be thinned out from the read image data, and the read slow-down thin-out data are notified to the image processing unit 3. The image processing unit 3 thins out main scan lines from image data (Gd) read in the slow-down operation by the original reading unit 11 and input via the image data storing unit 13, as depicted in FIGS. 5 (*c*) and (*d*), based on the slow-down thin-out data. Thus, the image processing unit 3 restores image data of the original (Ga). Thus, the image processing unit 3 can thin out only appropriate main scan lines from the image data (Gd) read in the slow-down reading operation, and thus, can generate proper restored image data (Gf) depicted in FIG. 5 (*d*), that is obtained from properly restoring the original image (Ga) of FIG. 5 (*a*), and has satisfactory image quality. Further, it is possible to appropriately carry out a thinning-out operation by appropriately determining main scan lines to be thinned out for an area of a boundary from the ordinary reading operation to the slow-down reading operation, and thus, also for such a boundary area, it is possible to properly improve image quality.

In the image reading apparatus 1, even during the slow-down reading operation and after the original conveyance is stopped, the read image data are transferred to the image processing unit 3 from the image data storing unit 13, the image processing unit 3 carries out image processing on the transferred image data, and thus, the data amount stored in the image data storing unit 13 is gradually reduced.

In the image reading apparatus 1, when the slow-down reading operation is thus carried out, and the driving motor 22 is slowed down to be finally stopped, the stored amount detecting unit 41 detects the stored data amount of the image data storing unit 13. When the stored amount detecting unit 41 detects that the stored data amount of the image data storing unit 13 has been reduced to the previously set predetermined slow-up starting data amount, the control unit 10 obtains the slow-up driving control data from the slow-up data table 32 and carries out a slow-up reading operation of driving the driving motor 22 according to the slow-up driving control data, gradually increasing a rotational speed of the driving motor 22, finally increasing the rotational speed of the driving motor 22 to the ordinary reading rotational speed, and thus, starting an ordinary reading operation.

At this time, the control unit 10 reads, from the slow-up data table 32 of the table data storing unit 14, the slow-up driving control data and slow-up thin-out data, controls driving of the driving motor 22 according to the slow-up driving control data, also sends the read slow-up thin-out data to the image processing unit 3, and causes the image processing unit 3 to carry out thinning-out of main scan lines according to the slow-up thin-out data.

Thus, the image reading apparatus 1 according to the embodiment carries out the ordinary reading operation of driving the driving motor 22 stepwise at predetermined ordinary reading step intervals, carrying out sub-scan movement of moving at least one of the original reading unit 11 and the original in the sub-scan direction, reading the original by the original reading unit 11, and storing the read image data in the image data storing unit 13. Further, the image reading apparatus 1 carries out the slow-down reading operation of, when the stored data amount of the image data storing unit 13 reaches the predetermined slow-down starting data amount, changing step intervals of the driving motor 22 to slow-down step intervals that are wider than the ordinary reading step intervals for finally stopping the driving motor 22 at a rotation angle of a phase excitation state (for example, a two-phase excitation state), from among plural excitation states of the driving motor 22 from which the driving motor 22 can be re-started, driving the driving motor 22 at the slow-down step intervals, causing the driving motor 22 to finally transition to a stopped state, still reading the original by the original reading unit 11, and notifying the image processing unit 3 of the slow-down thin-out data for determining main scan lines to be thinned out from the image data thus read by the original reading unit 11 at the slow-down step intervals. Further, the image reading apparatus carries out a slow-up reading operation of, when the stored data amount of the image data storing unit 13 reduces to the predetermined slow-up starting data amount, driving the driving motor 22 from the stopped state at slow-up step intervals that are wider than the ordinary reading step intervals, changing the step intervals of the driving motor 22 into the ordinary reading step intervals, still reading the original by the original reading unit 11, and notifying the image processing unit 3 of the slow-up thin-out data for determining main scan lines to be thinned out from the image data that have been read by the original reading unit 11 at the slow-up step intervals. The image processing unit 3 carries out the thinning-out operation of thinning out main scan lines from the read image data according to the notified slow-down thin-out data and slow-up thin-out data.

It is noted that a "step interval" denotes a time interval from a rotation angle of a step through a rotation angle of a subsequent step in the driving motor 22 (stepping motor), while the driving motor 22 is driven stepwise through every fixed rotation angle.

Thus, in the image reading apparatus 1 according to the embodiment, it is possible to appropriately control the driving motor 22 that carries out sub-scan driving, and also, to improve image quality of the read image data at low cost by effectively using the image data storing unit 13.

Further, in the image reading apparatus 1 according to the embodiment, data of slow-down step intervals (slow-down driving control data) for the driving motor 22 and slow-down thin-out data are stored in the table data storing unit 13 as the slow-down data table 31 for each of the numbers of steps. Then, based on a step position (rotation angle) of the driving motor 22 at an image reading time of the original reading unit 11 subsequent to a time when the stored data amount of the image data storing unit 13 reaches the slow-down starting data amount, the corresponding data of slow-down step intervals and the slow-down thin-out data are obtained from the table data storing unit 14, the driving motor 22 is driven according to the obtained data of slow-down step intervals, and the slow-down thin-out data are notified to the image processing unit 3.

Therefore, in the image reading apparatus 1, it is possible to speedily and appropriately determine the slow-down step intervals (slow-down driving control data) and slow-down thin-out data, to carry out the corresponding operations, and thus, it is possible to improve a processing speed and to achieve appropriate processing.

Further, in the image reading apparatus 1 in the embodiment, data of slow-up step intervals (slow-up driving control data) for the driving motor 22 and slow-up thin-out data are stored in the table data storing unit 14 as the slow-up data table 32, the data of slow-up step intervals and the slow-up thin-out data are obtained from the table data storing unit 14, the driving motor 22 is driven according to the slow-up step intervals, and the slow-up thin-out data are notified to the image processing unit 3.

Therefore, in the image reading apparatus 1, it is possible to speedily and appropriately determine the slow-up step intervals (slow-up driving control data) and the slow-up thin-out data to carry out the corresponding operations, and thus, it is possible to improve a processing speed and to achieve appropriate processing.

Further, in the image reading apparatus 1 in the embodiment, the stepping motor is used as the driving motor 22, a two-phase excitation state is set as a state of the driving motor 22 from which the driving motor 22 is started up, and the driving motor 22 is stopped at a rotation angle of any two-phase excitation state.

Therefore, it is possible to inexpensively and appropriately carry out scan driving, and it is possible to appropriately start up the stepping motor without an occurrence of a synchronization loss.

Further, in the image reading apparatus 1 in the embodiment, only an original is moved in the sub-scan direction by means of the driving motor 22.

Therefore, it is possible to read an image of an original that is conveyed by a simple driving mechanism, by means of the original reading unit 11 that is not moved, and thus, it is possible to carry out reading of an original at a further low cost appropriately.

It is noted that, control of a driving speed of the driving motor 22 is not limited to the above-mentioned control of changing a driving period (step interval). For example, control of changing an excitation way of the driving motor 22 may be used instead. That is, in this case, the control unit 10 carries out speed control of driving the driving motor 22 in a two-phase excitation way for the ordinary reading operation and driving the driving motor 22 in a 1-2 phase excitation way for the slow-down reading operation and for the slow-up reading operation. In this case, when the driving motor 22 is driven in the 1-2 phase excitation way, a rotation angle per one driving pulse is ½ of a rotation angle per one driving pulse in a case of driven in the two-phase excitation way, and thus, a rotation speed is decreased in the 1-2 phase excitation way accordingly. By thus changing the rotation speed of the driving motor 22 by changing the excitation way, it is possible to change the rotation speed of the driving motor 22 without changing the driving pulse rate (step interval).

Next, with reference to FIGS. 6A through 14, the embodiment of the present invention described above will be descried in more detail.

Figure 6B:
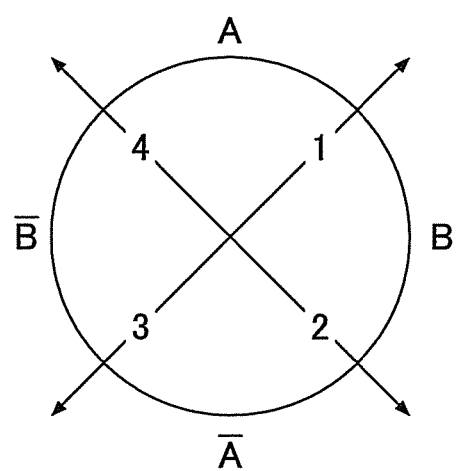

FIGS. 6A and 6B illustrate a driving method of a two-phase bipolar stepping motor, that can be applied as the driving motor 22, in the two-phase excitation way. In FIG. 6A, the numerals 1 through 4 depicted at the top denote step numbers. FIG. 6A (a) and (b) depict excitation voltage waveforms for a stator coil A; FIG. 6A (c) and (d) depict excitation voltage waveforms for a stator coil B; FIG. 6A (e) depicts an excitation current waveform for the stator coil A; and FIG. 6A (f) depicts an excitation current waveform for the stator coil B. FIG. 6B depicts a state where a rotor of the stepping motor is rotated by means of magnetic fields generated by the respective stator coils A and B as the excitation currents depicted in FIG. 6A (e), (f) flow therethrough. In FIG. 6B, numerals 1 through 4 depicted in a circle correspond to the above-mentioned step numbers 1 through 4, respectively, and depict corresponding rotation angles at states of the respective step numbers 1 through 4. As depicted in FIG. 6B, the rotation angle rotates clockwise 360 degrees as the excitation currents of the stator coils A and B change as depicted in FIG. 6A (e), (f).

In this two-phase excitation way, the stepping motor is in a two-phase excitation state in each of the respective step numbers 1 through 4. That is, as can be seen from FIG. 6A, in the step No. 1, the stator coils A and B are excited in a forward direction at equal magnitudes. In the step No. 2, the stator coil A is excited in a reverse direction and the stator coil B is excited in the forward direction at equal magnitudes. In the step No. 3, the stator coils A and B are excited in the reverse direction at equal magnitudes. In the step No. 4, the stator coil A is excited in the forward direction and the stator coil B is excited in the reverse direction at equal magnitudes.

Figure 7A:
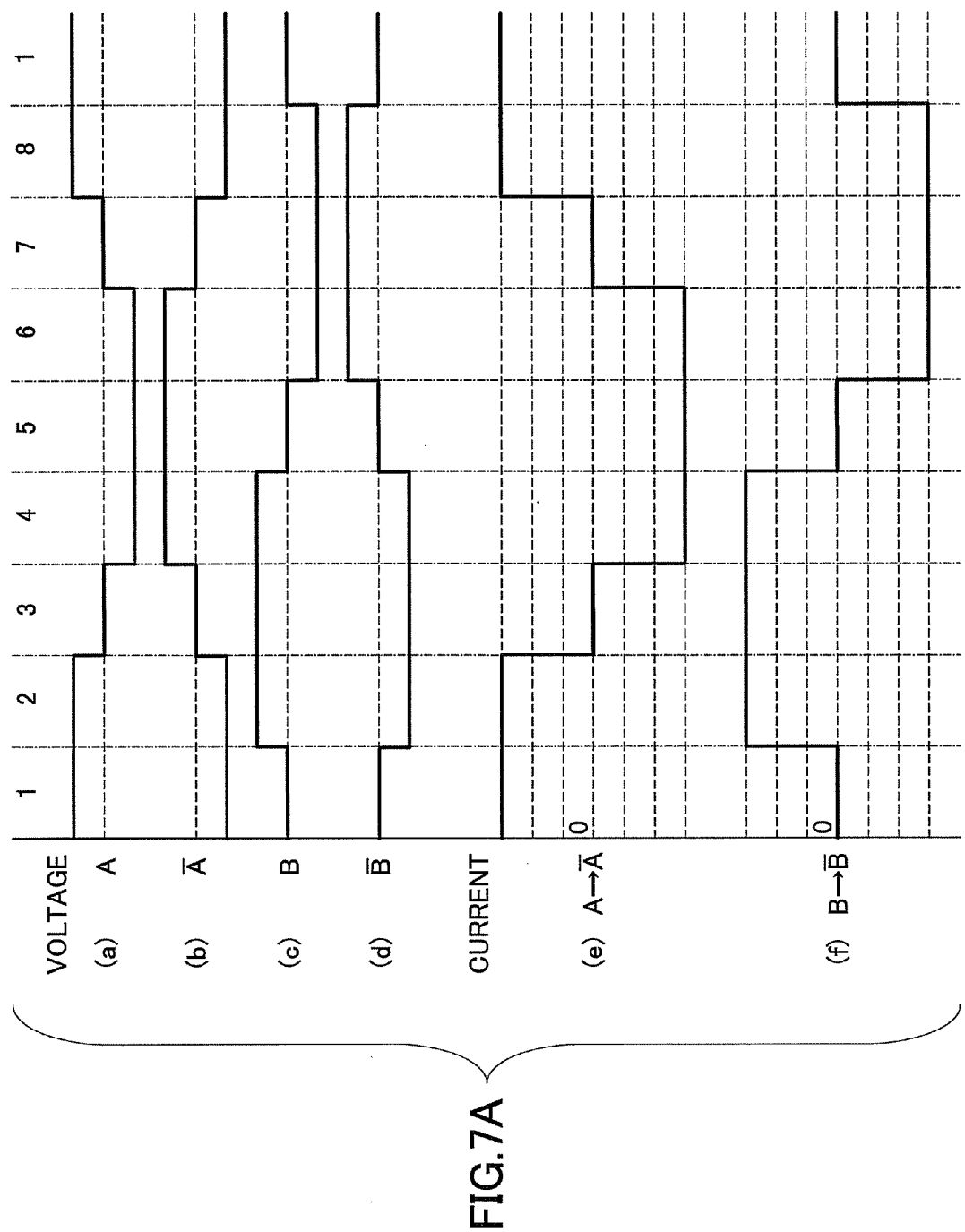
FIGS. 7A and 7B illustrate a 1-2 phase excitation way of a two-phase bipolar stepping motor.
Figure 7B:
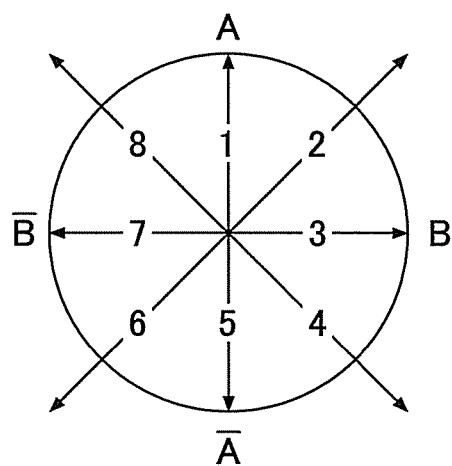

FIGS. 7A and 7B illustrate a driving method of the above-mentioned two-phase bipolar stepping motor in the 1-2 phase excitation way. In FIG. 7A, the numerals 1 through 8 depicted at the top denote step numbers. FIG. 7A (a) and (b) depict excitation voltage waveforms for the stator coil A; FIG. 7A (c) and (d) depict excitation voltage waveforms for the stator coil B; FIG. 7A (e) depicts an excitation current waveform for the stator coil A; and FIG. 7A (f) depicts an excitation current waveform for the stator coil B. FIG. 7B depicts a state where the rotor is rotated by means of magnetic fields generated by the respective stator coils A and B as the excitation currents depicted in FIG. 7A (e), (f) flow therethrough. As depicted in FIG. 7B, a rotation angle rotates 360 degrees clockwise as depicted in the numerals 1 through 8 as the excitation currents of the stator coils A and B change as depicted in FIG. 7A (e), (f).

In this 1-2 phase excitation way, the stepping motor is in a two-phase state in each of the respective step numbers 2, 4, 6 and 8. That is, as can be seen from FIG. 7A, in the step No. 2, the stator coils A and B are excited in the forward direction at equal magnitudes. In the step No. 4, the stator coil A is excited in the reverse direction and the stator coil B is excited in the forward direction at equal magnitudes. In the step No. 6, the stator coils A and B are excited in the reverse direction at equal magnitudes. In the step No. 8, the stator coil A is excited in the forward direction and the stator coil B is excited in the reverse direction at equal magnitudes.

Figure 8A:
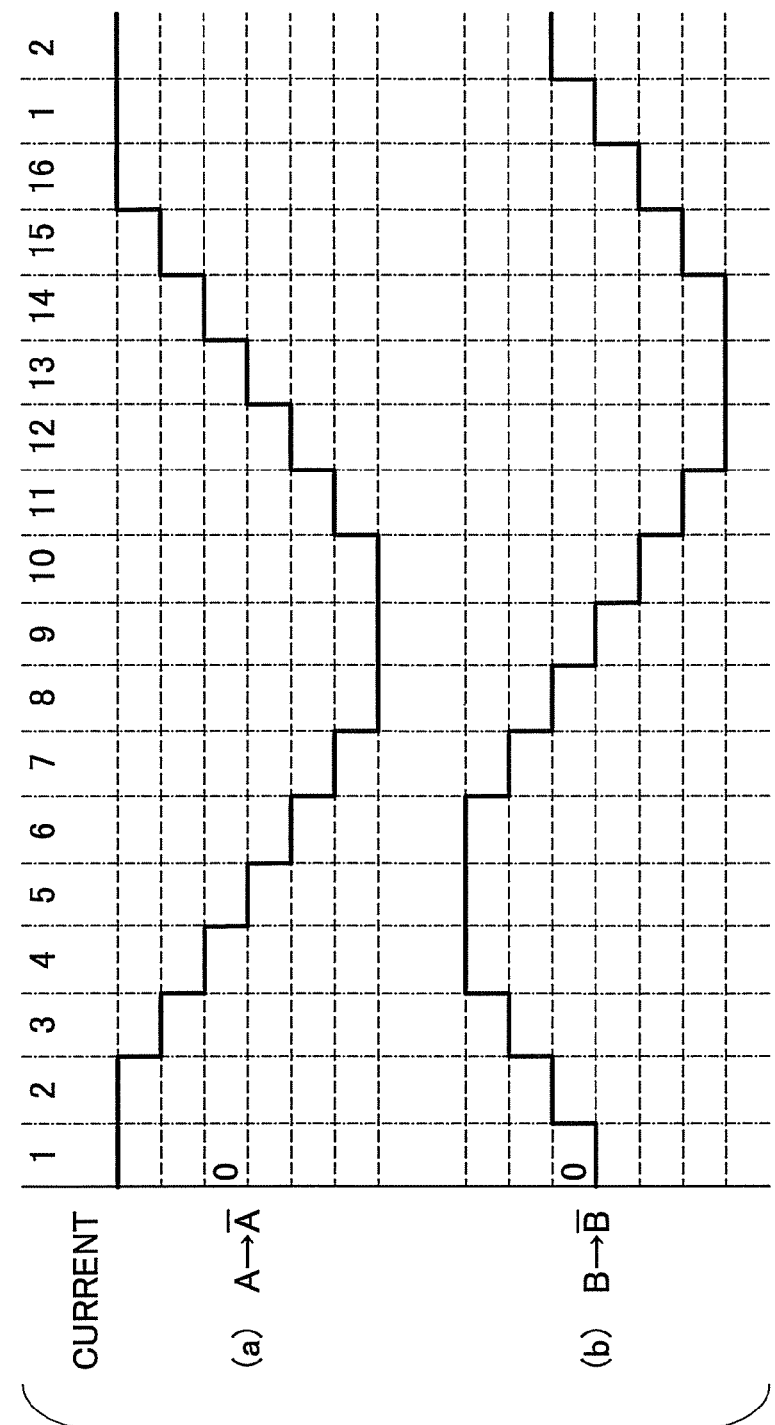
FIGS. 8A and 8B illustrate a W1-2 phase excitation way of a two-phase bipolar stepping motor.
Figure 8B:
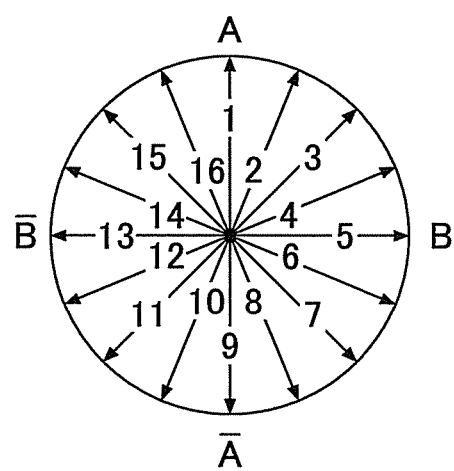

FIGS. 8A and 8B illustrate a driving method of the above-mentioned two-phase bipolar stepping motor in the W1-2 phase excitation way. In FIG. 8A, the numerals 1 through 16 depicted at the top denote respective step numbers. FIG. 8A (a) depicts an excitation current waveform for the stator coil. A; and FIG. 8A (b) depicts an excitation current waveform for the stator coil B. FIG. 8B depicts a state where the rotor is rotated by means of magnetic fields generated by the respective stator coils A and B as the excitation currents depicted in FIG. 8A (a), (b) flow therethrough. As depicted in FIG. 8B, a rotation angle rotates 360 degrees clockwise as the excitation currents of the stator coils A and B change as depicted in FIG. 8A (a), (b).

In this W1-2 phase excitation way, the stepping motor is in a two-phase excitation state in each of the respective step numbers 3, 7, 11 and 15. That is, as can be seen from FIG. 8A, in the step No. 3, the stator coils A and B are excited in the forward direction at equal magnitudes. In the step No. 7, the stator coil A is excited in the reverse direction and the stator coil B is excited in the forward direction at equal magnitudes. In the step No. 11, the stator coils A and B are excited in the reverse direction at equal magnitudes. In the step No. 15, the stator coil A is excited in the forward direction and the stator coil B is excited in the reverse direction at equal magnitudes. In this W1-2 phase excitation way, the number of steps occurring between each adjacent rotation angles of the respective rotation angles of the two-phase excitation states corresponding to the above-mentioned step Nos. 3, 7, 11 and 15, is 4 steps. That is, 7−3=4, 11−7=4, and 15−14=4.

Further, also in the case where the two-phase bipolar stepping motor is driven in the above-mentioned 4W1-2 phase excitation way, as in the case of driving in the w1-2 phase excitation way described above with reference to FIGS. 8A and 8B, there are four rotation angles corresponding to two-phase excitation states. However, in the case of driving in the 4W1-2 phase excitation way, the number of steps occurring between each adjacent rotation angles of the respective rotation angles corresponding to the two-phase excitation states is 16 steps. Therefore, in the case of driving in the 4W1-2 phase excitation way, when a current rotation angle is a rotation angle of the first step of the above-mentioned 16 steps, in the flowchart of FIG. 4, a result of a determination in step S103a becomes YES; when the current rotation angle is a rotation angle of the second step of the above-mentioned 16 steps, the result of the determination in step S103b becomes YES; . . . ; when the current rotation angle is a rotation angle of the fifteenth step of the above-mentioned 16 steps, the result of the determination in step S103o becomes YES.

Figure 9:
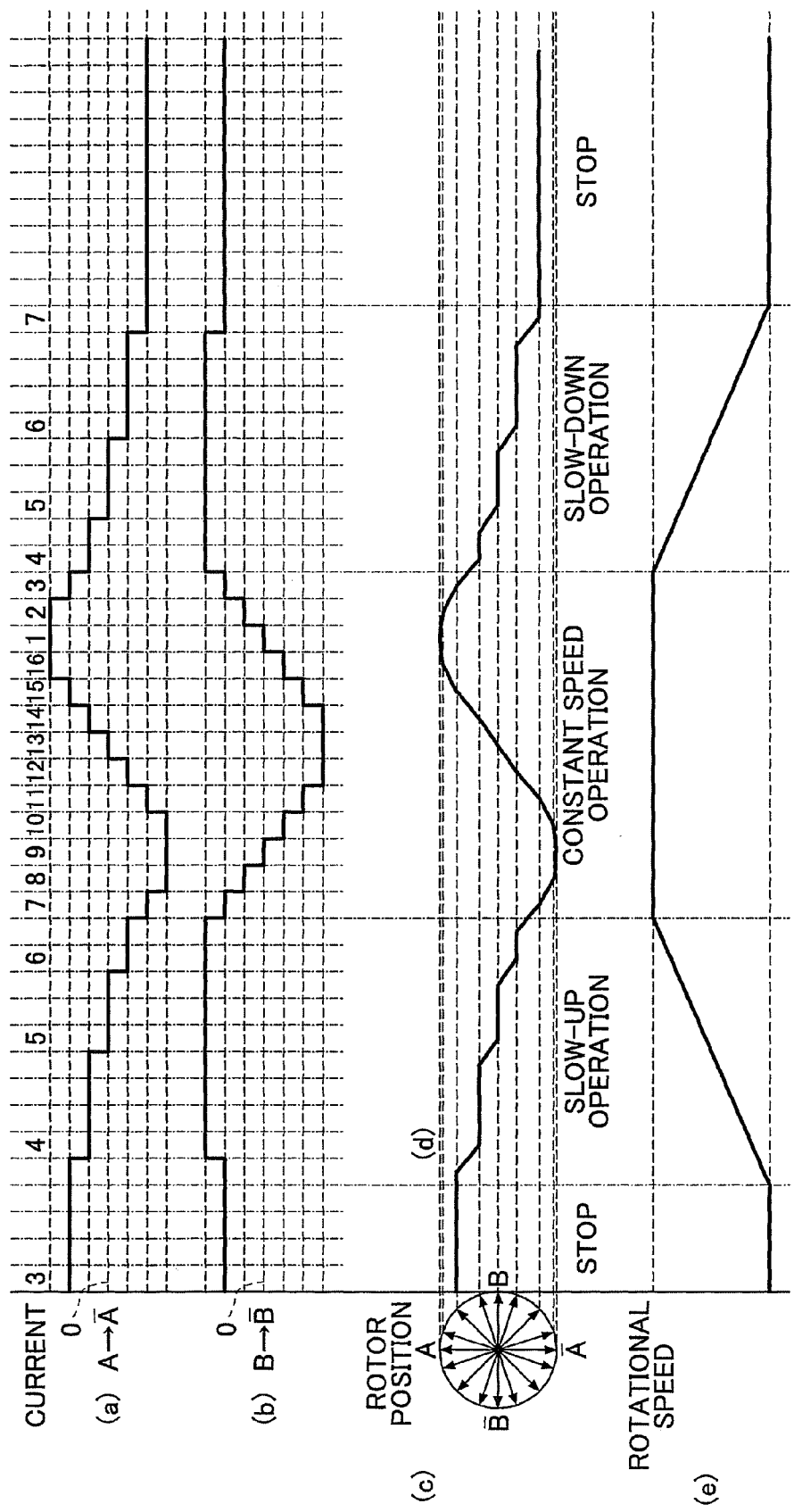
FIG. 9 illustrates a slow-up operation and a slow-down operation in the W1-2 phase excitation way of the two-phase bipolar stepping motor.

FIG. 9 depicts a manner in which, in a case of driving in the W1-2 phase excitation way, a slow-up operation is carried out from a state where the driving motor 22 is stopped; then a constant speed (ordinary reading rotation speed) operation is carried out; a slow-down operation is carried out; and then, finally, the driving motor 22 is stopped. The slow-up operation in FIG. 9 corresponds to, for example, the ordinary slow up or the intermittent reading slow up depicted in FIG. 2, The slow-down operation in FIG. 9 corresponds to, for example, the ordinary slow down or the intermittent reading slow down depicted in FIG. 2. It is noted that, although the driving motor 22 is driven in the 4W1-2 phase excitation way in the embodiment as mentioned above, hereinafter a description will be made assuming that the driving motor 22 is driven in the W1-2 phase excitation way for the purpose of convenience in explanation.

The numbers 3 through 16 and 1 through 7 depicted at the top of FIG. 9 respectively correspond to the step numbers 3 through 16 and 1 through 7 depicted at the top of FIG. 8A. FIG. 9 (a), (b) depict excitation currents in the stator coils A and B corresponding to those depicted in FIG. 8 (a), (b). FIG. 9 (c), (d) depict a rotation angle of the driving motor 22 corresponding to that depicted in FIG. 8B. FIG. 9 (e) depicts a rotational speed of the driving motor 22. Further, each division on the abscissa axis of FIG. 9 depicts a period of a driving control clock pulse. It is noted that a period of the driving control clock pulse corresponds to a period of the main scan line period pulse, and, a main scan line of image data is read by the original reading unit 11 every period of the driving control clock pulse. However, the driving control clock pulse and the main scan line period pulse are not necessarily synchronous with one another, and may be asynchronous with one another.

As depicted in FIG. 9, in this case, the driving motor 22 is first stopped at a rotation angle of step No. 3 (a rotation angle of a two-phase excitation state as mentioned above). After that, step intervals at respective steps Nos. 4, 5 and 6 are, as depicted in FIG. 9, four (4) driving control clock pulses, three (3) driving control clock pulses and two (2) driving control clock pulses, respectively (slow-up operation). After that, from the step No. 7 through the step No. 3 (steps Nos. 7 through 16 and 1 through 3), a constant speed operation as depicted in FIG. 8A is carried out in which a step interval of each step is one (1) driving control clock pulse. After that, step intervals at respective steps Nos. 4, 5 and 6 are, as depicted in FIG. 9, two (2) driving control clock pulses, three (3) driving control clock pulses and four (4) driving control clock pulses, respectively (slow-down operation). Finally, the driving motor 22 is stopped at a rotation angle of a step No. 7 (a rotation angle of a two-phase excitation state as mentioned above).

During the slow-up operation at the earlier steps Nos. 4 through 6 in FIG. 9, from among the slow-up operation from the stopped state, the constant speed operation, the slow-down operation and again the stopped state during the steps Nos. 3 through 16 and 1 through 7, the step interval is gradually reduced (the number of driving control clock pulses=4, 3, 2, 1). As a result, as depicted in FIG. 9 (e), the rotational speed of the driving motor 22 gradually increases. In contrast thereto, during the slow-down operation at the late steps Nos. 4 through 6, the step interval is gradually increased (the number of driving control clock pulses=1, 2, 3, 4). As a result, as depicted in FIG. 9 (e), the rotational speed of the driving motor 22 gradually decreases.

Figure 10:
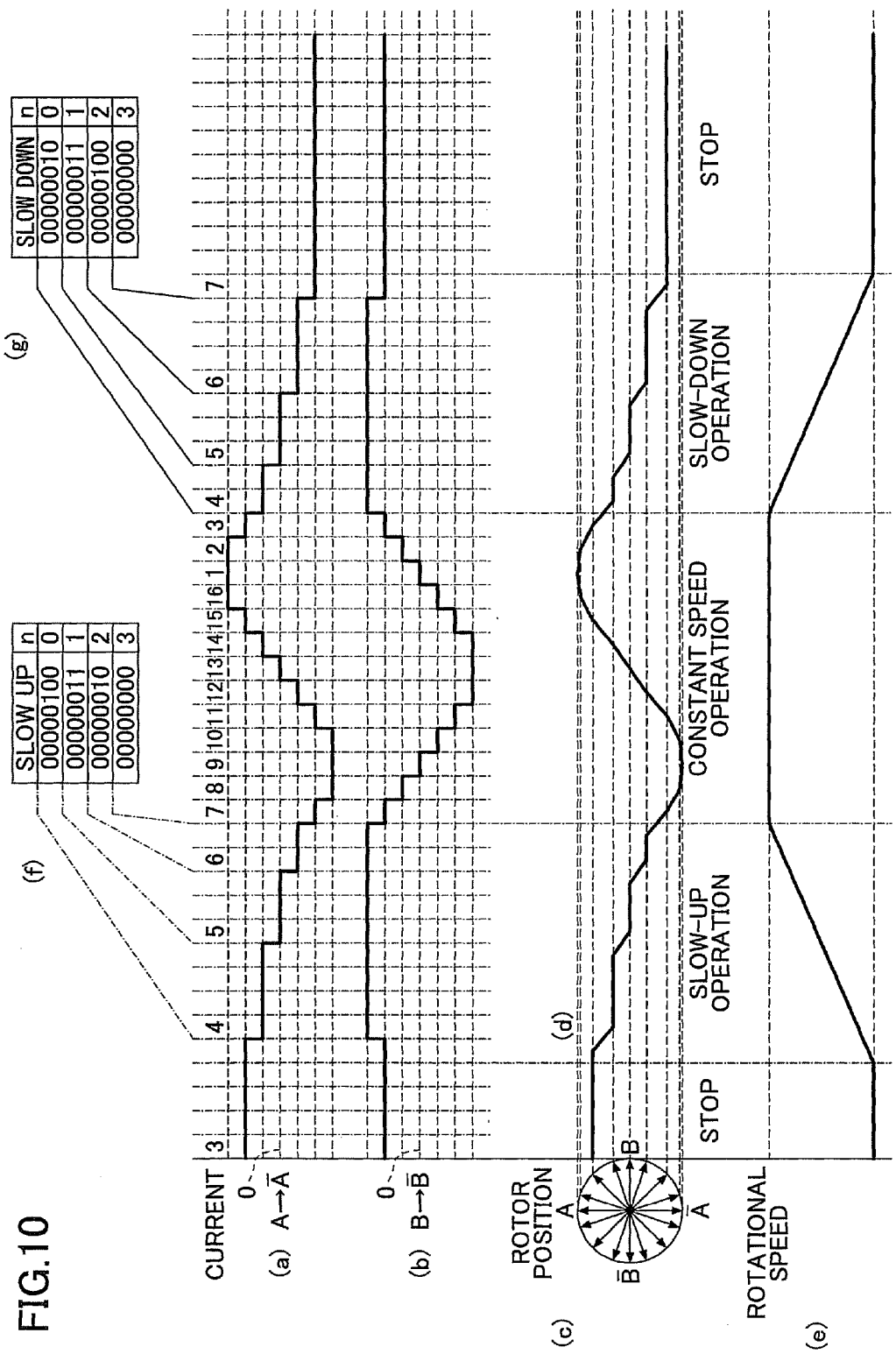
FIG. 10 illustrates slow-up/slow-down data table without carrying out thinning out.
Figure 11:
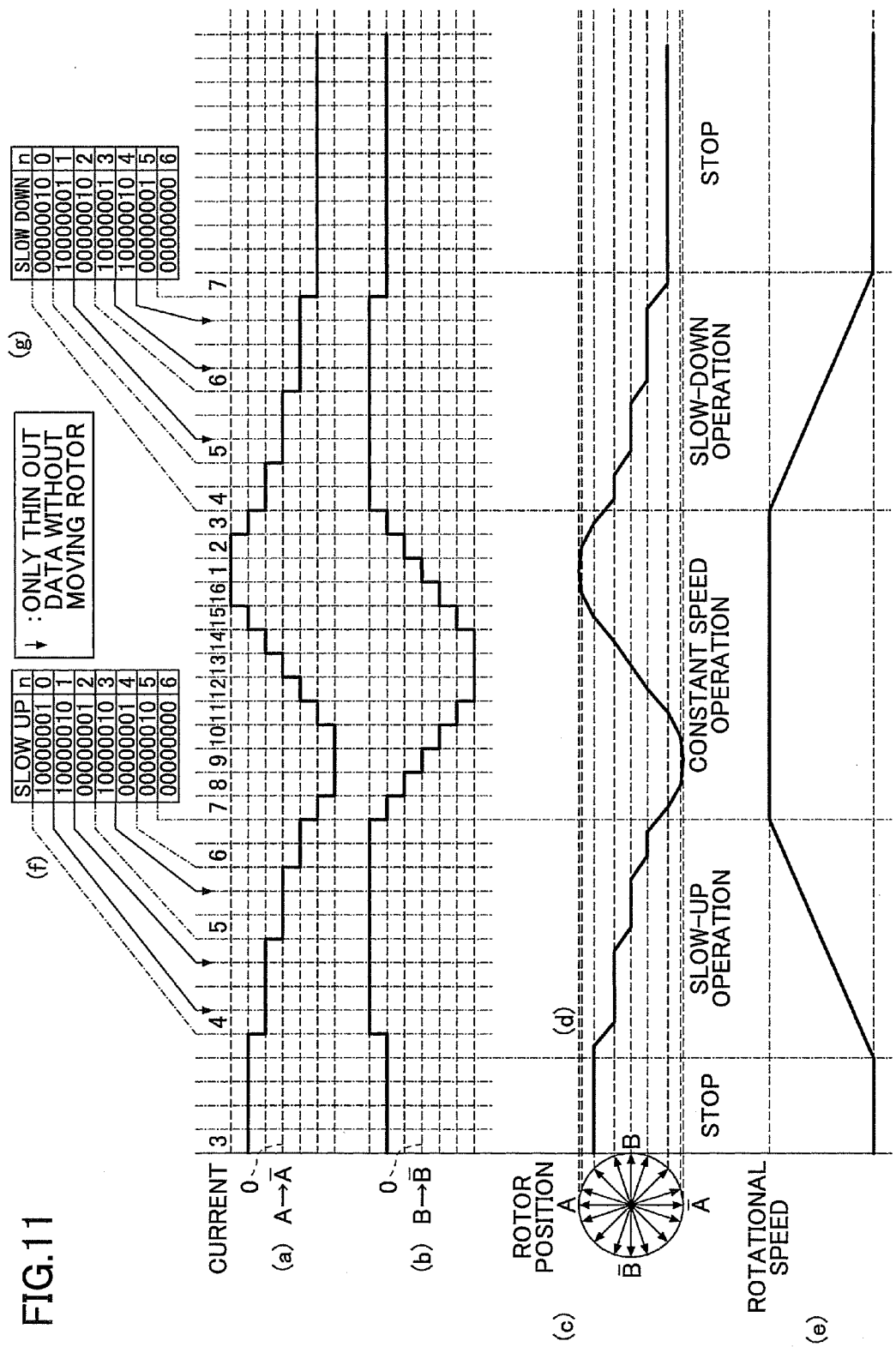
FIG. 11 illustrates slow-up/slow-down data table with carrying out thinning out.

FIGS. 10 and 11 illustrate the above-mentioned slow-down operation and slow-up operation carried out as a result of the control unit 10 controlling the driving motor 22 according to the slow-down data table 31 and slow-up data table 32, and a thinning-out operation carried out by the image processing unit 3.

FIG. 10 depicts an operation in a case where no thinning-out operation is carried out. The case where no thinning-out operation is carried out corresponds to the case of the ordinary slow up and the ordinary slow down depicted in FIG. 2, for example. FIGS. 10 (a), (b), (c), (d), and (e) correspond to FIGS. 9 (a), (b), (c), (d), and (e), respectively. FIG. 10 (f) depicts one example of a slow-up data table of no thinning-out, and FIG. 10 (g) depicts one example of a slow-down data table of no thinning-out. Each of the slow-up data table of no thinning-out and the slow-down data table of no thinning-out indicates the number of driving control clock pulses that defines a time interval to wait. In the slow-up data table of no thinning-out depicted in FIG. 10 (f), data 00000100 at n=0 indicate "4" in binary notation, and thus, the control unit 10 moves to a rotation angle of step No. 5 after waiting for four driving control clock pulses at a rotation angle of step No. 4, as depicted in FIG. 10. Similarly, data 00000011 at n=1 indicate "3" in binary notation, and thus, the control unit 10 moves to a rotation angle of step No. 6 after waiting for three driving control clock pulses at the rotation angle of step No. 5, as depicted in FIG. 10. Similarly, data 00000010 at n=2 indicate "2" in binary notation, and thus, the control unit 10 moves to a rotation angle of step No. 7 after waiting for two driving control clock pulses at the rotation angle of step No. 6, as depicted in FIG. 10.

In the slow-down data table of no thinning-out depicted in FIG. 10 (g), data 00000010 at n=0 indicate "2" in binary notation, and thus, the control unit 10 moves to the rotation angle of step No. 5 after waiting for two driving control clock pulses at the rotation angle of step No. 4, as depicted in FIG. 10. Similarly, data 00000011 at n=1 indicate "3" in binary notation, and thus, the control unit 10 moves to the rotation angle of step No. 6 after waiting for three driving control clock pulses at the rotation angle of step No. 5, as depicted in FIG. 10. Similarly, data 00000100 at n=2 indicate "4" in binary notation, and thus, the control unit 10 moves to the rotation angle of step No. 7 after waiting for four driving control clock pulses at the rotation angle of step No. 6, as depicted in FIG. 10. Finally, since data 00000000 at n=3 indicate "0" in binary notation, and "0" indicates an end of the slow-down operation, and the control unit 10 stops the driving motor 22 at the rotation angle of step No. 7, as depicted in FIG. 10.

FIG. 11 depicts an operation in a case where a thinning-out operation is carried out. The case where a thinning-out operation is carried out corresponds to the case of the intermittent reading slow up and the intermittent reading slow down depicted in FIG. 2, for example. FIGS. 11 (a), (b), (c), (d), and (e) correspond to FIGS. 9 (a), (b), (c), (d), and (e), respectively. FIG. 11 (f) depicts one example of the slow-up data table, and FIG. 11 (g) depicts one example of the slow-down data table. In the data of binary notation in the slow-up data table and slow-down data table, a MSB (Most Significant Bit, or highest bit) indicates whether a thinning-out operation is carried out, and the other bits indicate the number of driving control clock pulses that defines a time interval to wait. In the slow-up data table depicted in FIG. 11 (f), the MSB of data 10000001 at n=0 is "1" that indicates that a thinning-out operation is carried out, and the other bits indicate "1" in binary notation. Therefore, as depicted in FIG. 11, the control unit 10 waits for one driving control clock pulse at the rotation angle of step No. 4, and then, causes the image processing unit 3 to carry out a thinning-out operation. In the thinning-out operation, as depicted in FIG. 11, one main scan line of image data is thinned out, which has been read by the ordinal reading unit 11 at a first driving control clock pulse occurring after the driving motor 22 has moved to the rotation angle of step No. 4, stored in the image data storing unit 13 and transferred to the image processing unit 3.

Similarly, in the slow-up data table depicted in FIG. 11 (*f*), the MSB of data 10000010 at n=1 is "1" that indicates that a thinning-out operation is carried out, and the other bits indicate "2" in binary notation. Therefore, as depicted in FIG. 11, the control unit 10 further waits for two driving control clock pulses at the rotation angle of step No. 4, and then, causes the image processing unit 3 to carry out a thinning-out operation. In the thinning-out operation, as depicted in FIG. 11, one main scan line of image data is thinned out, which has been read by the ordinal reading unit 11 at a third driving control clock pulse occurring after the driving motor 22 has moved to the rotation angle of step No. 4, stored in the image data storing unit 13 and transferred to the image processing unit 3.

Further, in the slow-up data table depicted in FIG. 11 (*f*), the MSB of data 00000001 at n=2 is "0" that indicates that no thinning-out operation is carried out, and the other bits indicate "1" in binary notation. Therefore, as depicted in FIG. 11, the control unit 10 further waits for one driving control clock pulse at the rotation angle of step No. 4, and then, moves the driving motor 22 to the rotation angle of the subsequent step No. 5. Thus, the slow-up data table of FIG. 11 (*f*) includes both the slow-up driving control data (slow-up step intervals) and the slow-up thin-out data.

Next, also in a case of the slow-down table of FIG. 11 (*g*), similarly, the MSB of data 00000010 at n=0 is "0" that indicates that no thinning-out operation is carried out, and the other bits indicate "2" in binary notation. Therefore, as depicted in FIG. 11, the control unit 10 waits for two driving control clock pulses at the rotation angle of step No. 4, and then, moves the driving motor 22 to the rotation angle of the subsequent step No. 5. The MSB of data 10000001 at n=1 is "1" that indicates that a thinning-out operation is carried out, and the other bits indicate "1" in binary notation. Therefore, as depicted in FIG. 11, the control unit 10 waits for one driving control clock pulse at the rotation angle of step No. 5, and then, causes the image processing unit 3 to carry out a thinning-out operation. In the thinning-out operation, as depicted in FIG. 11, one main scan line of image data is thinned out, which has been read by the ordinal reading unit 11 at a first driving control clock pulse occurring after the driving motor 22 has moved to the rotation angle of step No. 5, stored in the image data storing unit 13 and transferred to the image processing unit 3. Thus, also the slow-down data table of FIG. 11 (*g*), thus includes both the slow-down driving control data (slow-down step intervals) and the slow-down thin-out data.

The slow-down data table depicted in FIG. 11 (*f*) corresponds to the slow-down data table for the case where the number of step is 0 in the flowchart depicted in FIG. 4. In the case where the driving motor 22 is driven in the W1-2 phase excitation way as mentioned above, the number of steps between each adjacent rotation angles of the two-phase excitation states is 4, as mentioned above. Therefore, in this case, the number of the slow-down data tables is 4, i.e., Ta, Tb, Tc and Td. In contrast thereto, in the case of the 4W1-2 phase excitation way as mentioned above, the number of steps between each adjacent rotation angles of the two-phase excitation states is 16, as mentioned above. Therefore, in this case, the number of the slow-down data tables is 16, i.e., Ta through Tp, as mentioned above.

Therefore, in the case of W1-2 phase excitation way, when the number of steps (number of steps in motor) is 1, 2, or 3 in an operation, corresponding to steps S103*a* through S103*o* of the case of 4W1-2 phase excitation way, the corresponding slow-down data table Ta, Tb or Tc is loaded in an operation, corresponding to steps S104*a* through S104*o* of the case of 4W1-2 phase excitation way. On the other hand, when the number of steps is 0, the corresponding slow-down data table Td is loaded in an operation, corresponding to step S104*p* of the case of 4W1-2 phase excitation way. The case where the number of steps is 0 is a case where a current rotation angle of the driving motor 22 is a rotation angle of a two-phase excitation state.

As mentioned above, the slow-down data table depicted in FIG. 11 (*f*) corresponds to the slow-down data table for the case where the number of steps is 0 in the flowchart depicted in FIG. 4. Therefore, in this case, the current rotation angle is a rotation angle of a two-phase excitation state (that is, step No. 3), and thus, the slow-down table Td is loaded. Therefore, in this case, according to the slow-down data table Td (i.e., the slow-down table of FIG. 11 (*g*)), the slow-down operation and the thinning-out operation are carried out as described above with reference to FIG. 11. In other words, the case of FIG. 11 corresponds to the case where a rotation angle of the driving motor 22, at a time when the stored data amount of the image data storing unit 13 reaches the predetermined slow-down starting data amount in step S101 of FIG. 4, is the rotation angle of step No. 3. In this case, in the next step S102 of FIG. 4, a time is waited until a next main scan line period pulse is asserted. Then, when the next main scan line period pulse is asserted, the current rotation angle is determined in the step, corresponding to steps S103*a* through S103*o* of the case of 4W1-2 phase excitation way (with the driving motor 22 then being moved to the rotation angle of the next step No. 4 in the constant speed operation). Since the current rotation angle obtained in the step, corresponding to steps S103*a* through S103*o* of the case of 4W1-2 phase excitation way, is step No. 3 as mentioned above, the number of steps (number of steps in the motor) is 0. Therefore, as mentioned above, the slow-down data table Td (i.e., the slow-down data table of FIG. 11 (*g*)) is loaded, and thus, as mentioned above, according to the slow-down data table Td (i.e., the slow-down table of FIG. 11 (*g*)), the slow-down portion and thinning-out operation are carried out as described above with reference to FIG. 11.

It is noted that, as an example, each of the above-mentioned slow-down tables Ta, Tb and Tc other than the slow-down table Td, a slow-down data table can be applied for continuing a constant speed operation up to a rotation angle of the immediately subsequent two-phase excitation state, and after reaching the rotation angle of the immediately subsequent two-phase excitation state, carrying out a slow-down operation according to the slow-down data table Td (i.e., the slow-down data table of FIG. 11 (*g*)) as described above with reference to FIG. 11.

Further, the above-mentioned slow-up data table and the slow-down data table are merely examples, and actually, the number of data included in each of the slow-down data table and the slow-up data table, and each values of the data, may be determined according to actual values of acceleration of the stepping motor during the slow-down operation and the slow-up operation. Further, in an actual design stage, a design may be carried out, as to where data indicating a thinning-out operation is inserted in each of the slow-down data table and the slow-up data table, according to acceleration of the stepping motor, and actual values of the main scan line period and so forth. Furthermore, an adjustment may be carried out on an actual product of the image reading apparatus in the embodiment.

Figure 12:
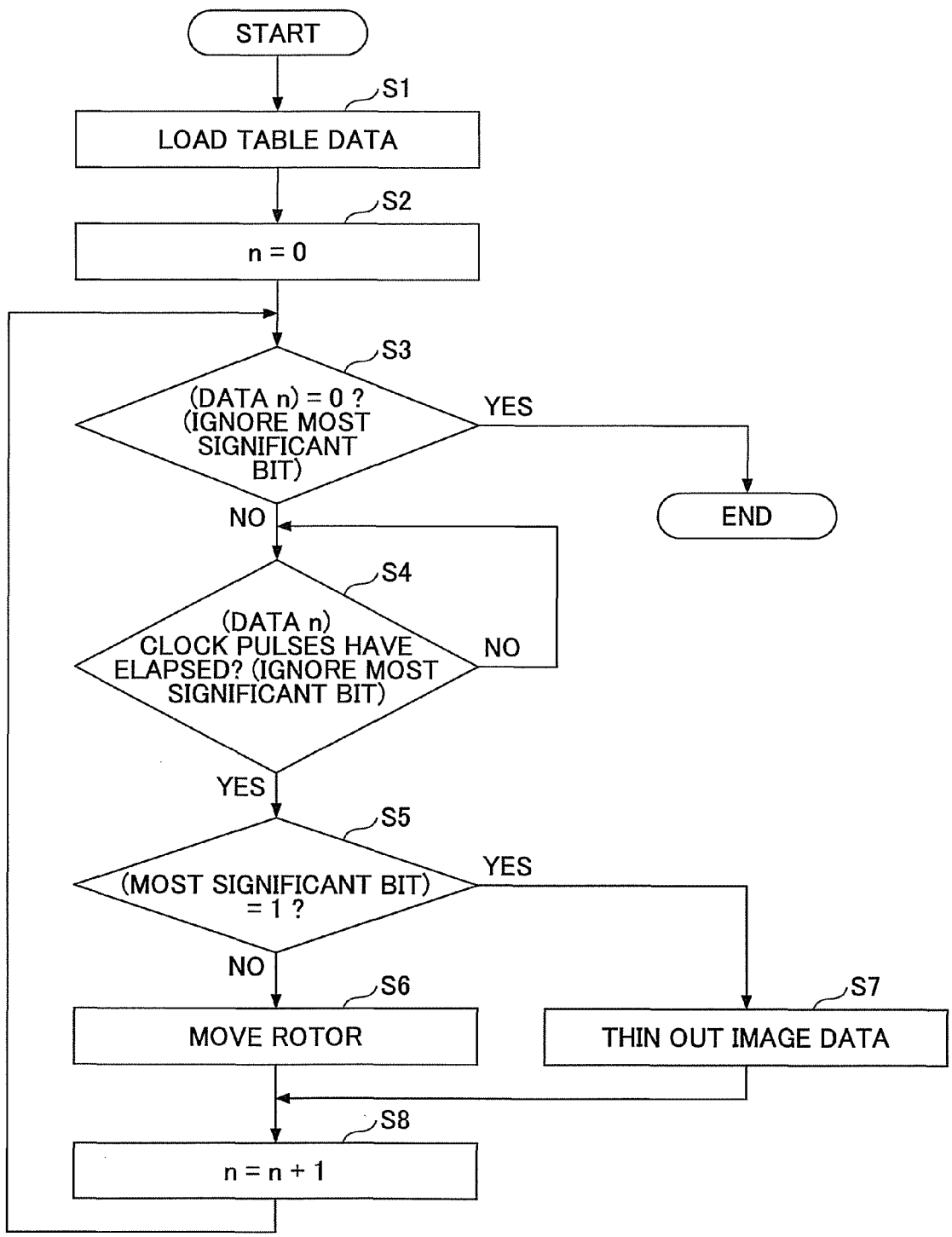
FIG. 12 depicts a flowchart of a slow-down reading operation.

FIG. 12 depicts a flowchart for an operation in which the control unit 10 controls an operation of the driving motor 11 according to the slow-down data table 31, and thus, carries out the slow-down operation.

In FIG. 12, in step S1, the control unit 10 loads the slow-down data table (corresponding to steps S104*a* through S104o in FIG. 4), and then, in step S2, a setting is made such that n=0. Next, in step S3, it is determined whether data of a current n indicate 0 (under the condition where the MSB of the data is ignored). When the data other than the MSB indicate 0 (for example, the data at n=6, in FIG. 11 (g)), the current operation is finished. On the other hand, when the data other than the MSB indicate a value other than 0, step S4 is carried out. In step S4, a time is waited for the number of driving control clock pulses, which number is one indicated by the data other than the MSB. For example, the data at n=0 in FIG. 11 (g), is 00000010 that indicate "2" in binary notation, under the condition where the MSB is ignored. Therefore, in this case, the control unit 10 waits for two driving control clock pulses at the rotation angle of step No. 4. After that (YES in step S4), the control unit 10 determines in step S5 whether the MSB of the data is 1. When the MSB is 0 (NO in step S5), the driving motor 22 is moved to the rotation angle of the next step, in step S6. In the example of FIG. 11(g), the data at n=0 is 00000010 that has the MSB of 0, and in this case, as mentioned above, after a time is waited for two driving control pulses at the rotation angle of step No. 4, the driving motor 22 is moved to the rotation angle of the next step No. 5. On the other hand, when the MSB of the data is 1 (YES in step S5), the image processing unit 3 carries out a thinning-out operation in step S7. In the example of FIG. 11 (g), the MSB of the data 10000001 at n=1 is 1, and the other bits indicate "1" in binary notation as mentioned above. In this case, a time is waited for one driving control clock pulse at the rotation angle of the step No. 5, and then, one main scan line of image data read at the driving control clock pulse is thinned out by the image processing unit 3. After that, in step S8, n is incremented by 1, and step S3 is carried out again.

Figure 13:
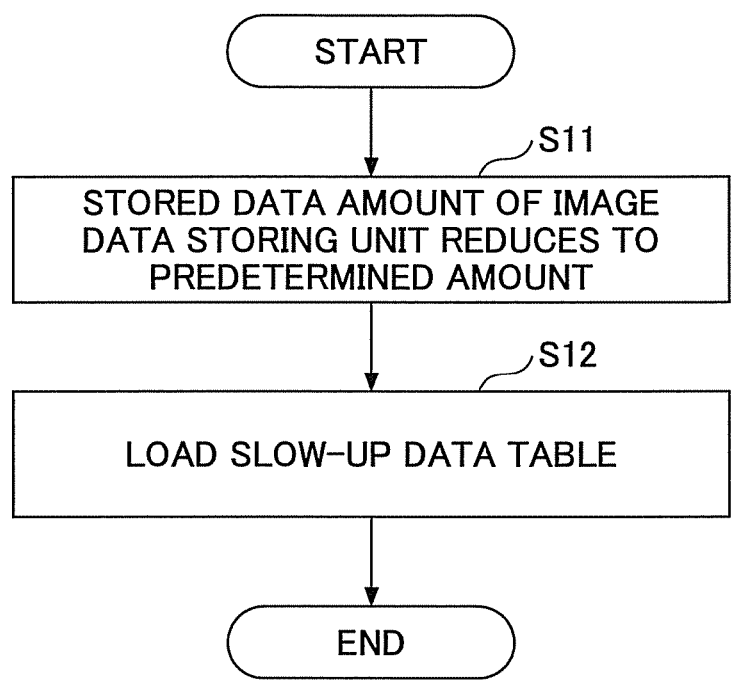
FIGS. 13 and 14 depict flowcharts of a slow-up reading operation.

FIG. 13 depicts a flowchart for a slow-up operation corresponding to the flowchart for a slow-down operation depicted in FIG. 4. In FIG. 13, in step S11, when the stored data amount in the image data storing unit 13 has been reduced to the predetermined slow-up starting data amount (YES), the control unit 10 loads the slow-up data table in step S12.

Figure 14:
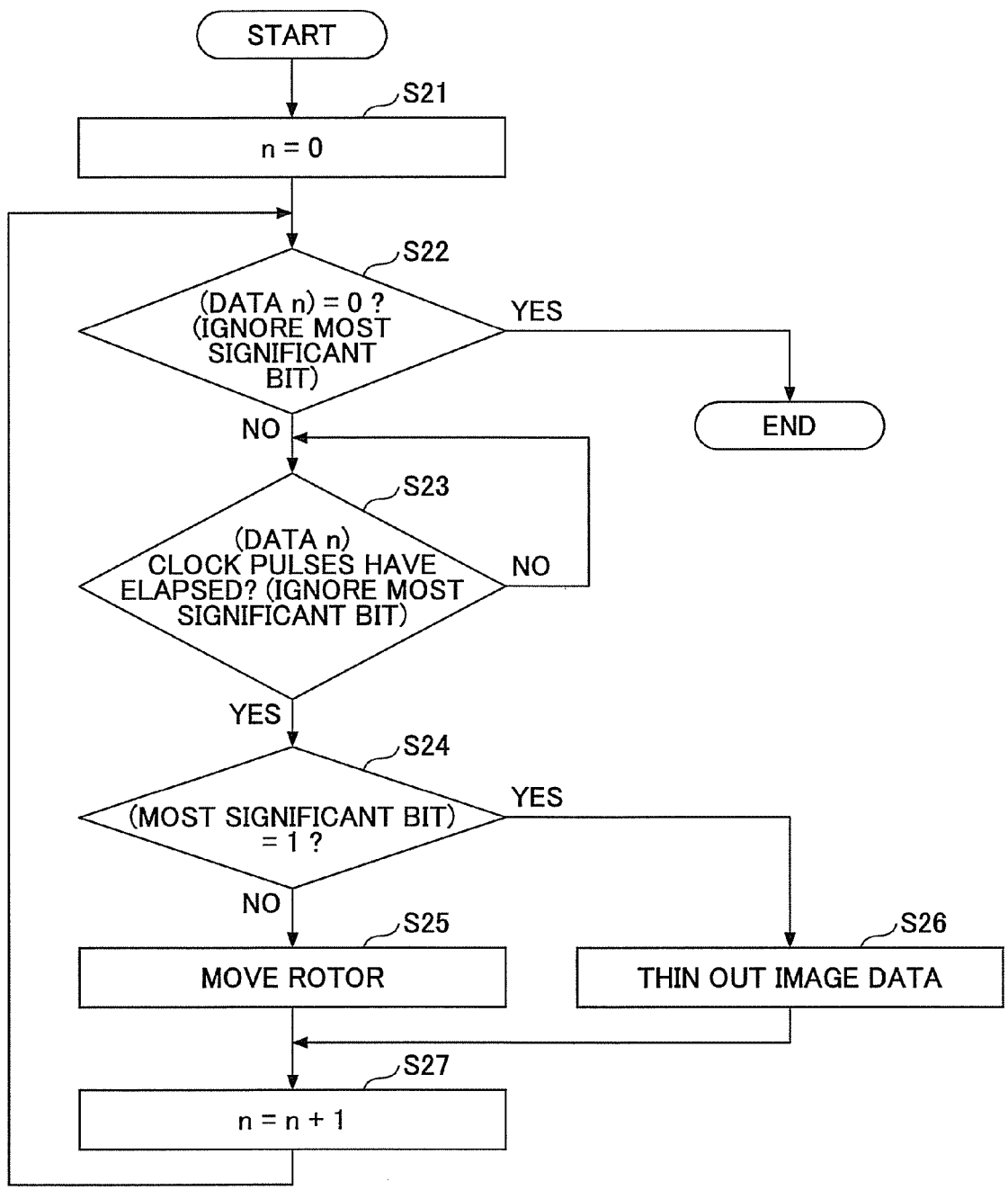

FIG. 14 depicts a flowchart for a slow-up operation corresponding to the flowchart depicted in FIG. 12. In FIG. 14, in step S21, the control unit 10 loads the slow-up table (corresponding to step S12 of FIG. 13), and then, in step S22, a setting is made such that n=0. Next, in step S23, it is determined whether data in the loaded slow-up data table at a current n indicate 0 (under the condition where the MSB of the data is ignored). When the data other than the MSB indicate 0 (for example, data at n=6, in FIG. 11(f)), the current operation is finished. On the other hand, when the data other than the MSB indicate a value other than 0, step S24 is carried out. In step S24, a time is waited for the number of driving control clock pulses, which number is indicated by the data other than the MSB. For example, the data at n=0 in FIG. 11 (f), is 10000001 that indicate "1" in binary notation, under the condition where the MSB is ignored. Therefore, in this case, the control unit 10 waits for one driving control clock pulse at the rotation angle of the step No. 4. After that (YES in step S24), the control unit 10 determines in step S25 whether the MSB of the data is 1. When the MSB is 0 (NO in step S25), the driving motor 22 is moved to the rotation angle of the next step, in step S26. In the example of FIG. 11 (f), the data at n=2 is 00000001 that has the MSB of 0 and the other bits indicate "1" in binary notation. In this case, as mentioned above, after a time is waited for one driving control pulse at the rotation angle of step No. 4, the driving motor 22 is moved to the rotation angle of the next step No. 5. On the other hand, when the MSB of the data is 1 (YES in step S25), the image processing unit 3 carries out a thinning-out operation in step S27. In the example of FIG. 11 (f), the MSB of the data 10000001 at n=0 is 1, and the other bits indicate "1" in binary notation as mentioned above. In this case, a time is waited for one driving control clock pulse at the rotation angle of the step No. 4, and then, one main scan line of image data read at the driving control clock pulse is thinned out by the image processing unit 3. After that, in step S28, n is incremented by 1, and step S23 is carried out again.

Figure 15:
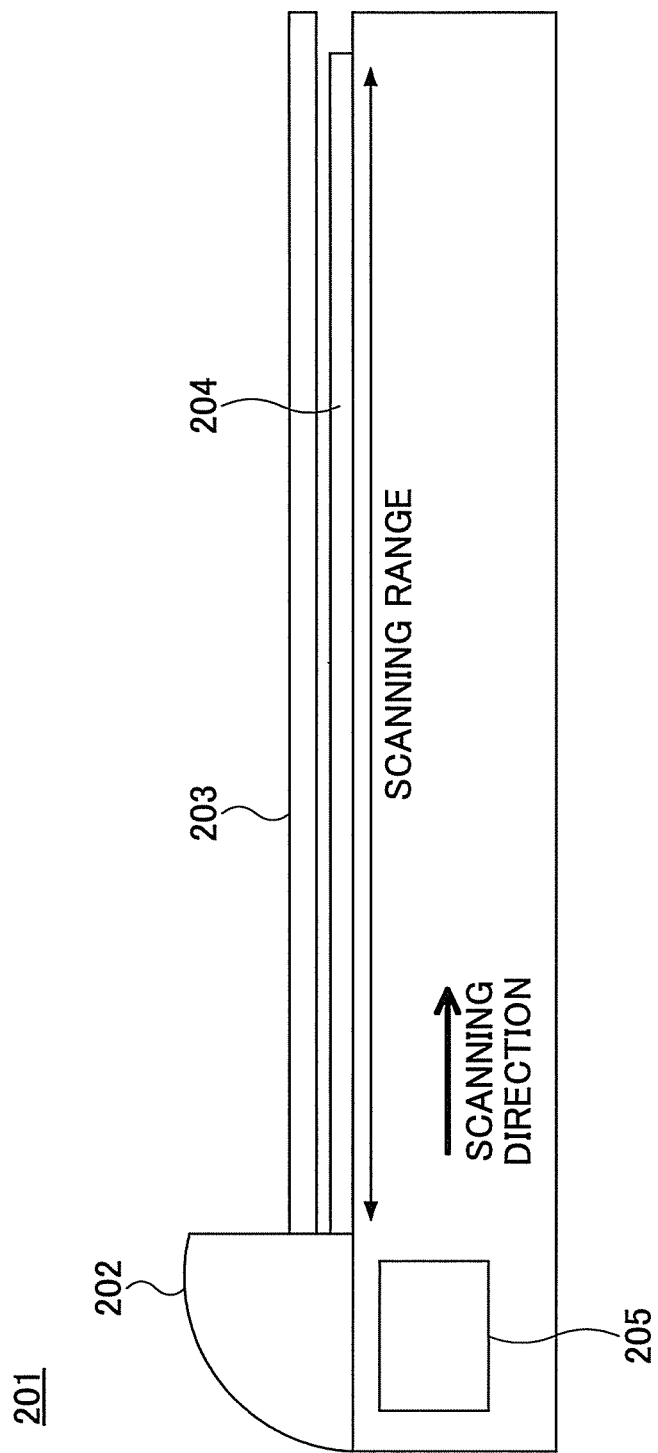
FIG. 15 depicts an example of hardware of an image reading apparatus according to another embodiment of the present invention.

In the above description, the original is conveyed by the driving motor 22 of the automatic document feeding unit 12, while the image of the original is read by the original reading unit 11 that is not moved. However, an embodiment of the present invention is not limited in the configuration. Conversely, another embodiment may be carried out in which an original that does not move is read by an original reading unit that is moved to scan the original in a sub-scan direction to read the original. FIG. 15 depicts a side view of an image reading apparatus according to the other embodiment of the present invention.

The image reading apparatus 201 in the other embodiment of the present invention depicted in FIG. 15 includes an automatic document feeding unit 202, an original pressure plate 203, a glass table (contact table) 204, and a reading module 205. In the reading module 205, on a carriage, a light source and mirrors (each not depicted) are mounted. In the image reading apparatus 201, to an original set on the glass plate 204, a reading light is applied from the light source on the carriage while the carriage of the reading module 205 is moved in the sub-scan direction by a driving motor such as a scanner motor (not depicted). Then, the mirrors on the carriage of the reading module 205 reflect light reflected by the original, toward a direction of a CCD (not depicted) provided in the reading module 205, and the CCD converts the light reflected by the original into an electric signal. Thus, an image of the original is read in the image reading apparatus 201. In the configuration of FIG. 15, the driving motor such as a scanner motor moving the carriage of the reading module 205 corresponds to the driving motor 22. The image reading apparatus 201 depicted in FIG. 15 has the same configuration as that of the image reading apparatus 1 described above with reference to FIGS. 1 through 14, except the mechanism that actually scans and reads an original described above with reference to FIG. 15, and operates in the same way, except the operation of the mechanism that actually scans and reads an original described above with reference to FIG. 15.

Further, it is also possible to achieve an image reading apparatus in yet another embodiment of the present invention in which both an original and an original reading unit are moved with respect to one another in the sub-scan direction, the original is scanned and read by the original reading unit.

The present invention is not limited to the specifically disclosed embodiments, and variations and modifications may be made without departing from the scope of the present invention.

Further, the present invention may be applied to an image reading apparatus such as a scanner apparatus, a copying apparatus, a multi-function peripheral apparatus, a facsimile apparatus or such, an image reading method, and a computer-readable information recording medium.

The present application is based on Japanese priority applications Nos. 2008-289683 and 2009-245874, filed Nov. 12, 2008 and Oct. 26, 2009, respectively, the entire contents of which are hereby incorporated herein by reference.

What is claimed is:

1. An image reading apparatus, comprising:
   an original reading unit configured to read image data from the original;

a driving motor configured to drive at least one of the original reading unit and the original in a sub-scan direction so that the original reading unit scans the original to read the image data;

an image data storing unit configured to store the image data read by the original reading unit;

an image processing unit configured to restore image data of the original from the image data stored by the image data storing unit; and a reading operation control unit configured to control a rotational speed of the driving motor, wherein:

when an amount of the image data stored by the image data storing unit becomes equal to or more than a predetermined amount, the reading operation control unit reduces the rotational speed of the driving motor according to driving control data provided for each of current rotation angles of the driving motor, for finally stopping the driving motor at a predetermined rotation angle, and for reducing a speed in the sub-scan direction at which the original reading unit reads the original, and the image processing unit thins out main scan line data from the image data stored by the image data storing unit according to thin-out data provided for each driving control data to restore the image data of the original.

2. The image reading apparatus as claimed in claim 1, wherein:

the driving motor comprises a stepping motor, the predetermined rotation angle of the driving motor is a rotation angle at which a two-phase excitation state occurs, the reading operation control unit stops the driving motor at the rotation angle of the two-phase excitation state, starts up the driving motor from the rotation angle of the two-phase excitation state, and drives the driving motor stepwise at step intervals, and when the amount of the image data stored by the image data storing unit becomes equal to or more than the predetermined amount, the reading operation control unit extends a step interval of the stepping motor according to the driving control data to reduce the rotational speed of the driving motor.

3. The image reading apparatus as claimed in claim 2, wherein:

the image processing unit thins out main scan line data having been read by the original reading unit in the step interval extended by the reading operation control unit from the image data stored by the image data reading unit.

4. The image reading apparatus as claimed in claim 3, wherein:

the reading operation control unit, when extending the step interval to reduce the rotational speed of the driving motor, gradually extends the step interval to gradually reduce the rotational speed of the driving motor, and the image processing unit thins out the number of main scan line data, which number corresponds to a degree at which the reading operation control unit extends the step interval.

5. The image reading apparatus as claimed in claim 2, wherein:

the driving control data are provided for each of count values of the number of steps of the driving motor counted from the rotation angle of the two-phase excitation state through the current rotation angle.

6. The image reading apparatus as claimed in claim 5, wherein: the driving control data have a form of a slow-down data table provided for each of the count values of the number of steps counted from the rotation angle of the two-phase excitation state through the current rotation angle, and the thin-out data comprise slow-down thin-out information included in each of the slow-down data tables.

\* \* \* \* \*